Figure 1:
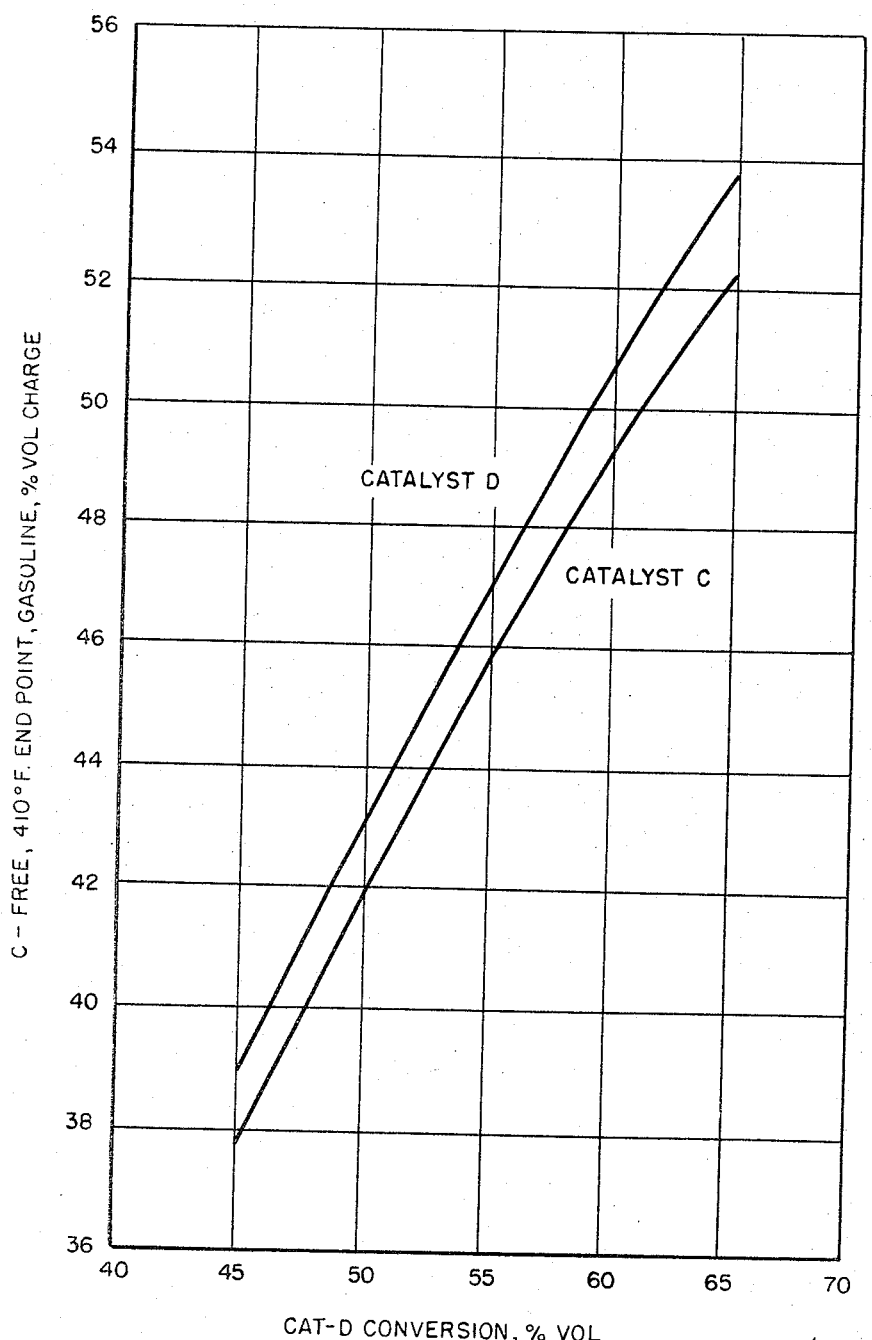

Inventors
Robert H. Cramer
Abbot F. Houser
Kenneth I. Jagel, Jr.
By [signature]
Agent 3,312,615
CATALYST COMPOSITION CONTAINING A CRYSTALLINE ALUMINO-SILICATE, A SILICEOUS MATRIX AND INERTS FOR THE CONVERSION OF HYDROCARBONS
Robert H. Cramer, Rifle, Abbott F. Houser, Cherry Hill, and Kenneth I. Jagel, Jr., Rifle, Colo., assignors to Mobil Oil Corporation, a corporation of New York
Filed Apr. 9, 1965, Ser. No. 447,019
20 Claims. (Cl. 208—120)

The present application is a continuation-in-part of co-pending applications, Ser. Nos. 197,247, and 197,248, both filed on May 24, 1962, now abandoned.

This invention relates to methods of preparing improved catalyst compositions and the use thereof in conversion processes. More particularly, the present invention is directed to novel catalysts comprising specific quantities of crystalline aluminosilicate particles of high catalytic activity and substantially inert fines of particular and specified physical properties, incorporated in an inorganic oxide matrix of a high catalytic activity less than that of said crystalline aluminosilicate particles. The invention also relates to methods of preparing such catalysts and to the use thereof in hydrocarbon conversion processes.

As is well known, there are numerous materials, both of natural and synthetic origin, which have the ability to catalyze the cracking of hydrocarbons. The mere ability to catalyze cracking, however, is far from sufficient to afford a catalyst of commercial significance. Of the presently commercially available cracking catalysts, a synthetic silica-alumina composite catalyst is widely used. While such catalyst is superior in many ways to the earlier employed clay catalysts and is fairly satisfactory, it is subject to improvement, particularly in regard to its ability to afford a high yield of useful product with a concomitantly small yield of undesired product.

Modern catalytic processes, moreover, require catalysts which are not only specifically active in the chemical reactions which are to be catalyzed but also possess physical characteristics required for successful commercial operation. One of the outstanding physical attributes of a commercial catalyst is the ability to resist attrition. The ability of a particle to hold its shape in withstanding the mechanical handling to which it is subjected upon storage, shipment and use is a primary requirement for a successful catalyst and for modern catalytic processes.

Thus, commercial catalytic cracking has been carried out by contacting a hydrocarbon charge in the vapor or liquid state with a catalyst of the type indicated hereinabove under conditions of temperature, pressure and time to achieve substantial conversion of the charge to lower boiling hydrocarbons. Such cracking processes are generally advantageously carried out employing methods wherein the catalyst is subject to continuous handling. In these operations, a moving stream of hydrocarbon feed is contacted with a moving stream of catalyst for the accomplishment of conversion and thereafter the catalyst is regenerated and returned to the conversion zone. This continuous handling and regeneration of the catalyst particles results in considerable breakage and constant abrasion, thereby consuming the catalyst. Accordingly, it is desirable to utilize a hard porous catalyst having the ability to withstand abrasion during the necessary handling involved during conversion and regeneration.

A further property of hard porous catalyst compositions is erosivity which, if at a high level, undesirably gives rise to detrimental erosion of reactor equipment, transfer lines etc. Accordingly, although it is desirable to obtain catalyst composites of high attrition resistance, it is equally desirable to obtain a composite having low erosivity in order that excessive equipment wear may be avoided. The properties of attrition resistance and erosivity are, however, not completely interdependent and it is, therefore, both desirable and possible to obtain catalyst composites having both high attrition resistance and low erosivity.

Another property of catalyst compositions important in certain applications is particle density. Especially in moving bed catalytic cracking units, a cracking catalyst of high density is preferably employed to allow greater unit capacity and greater efficiency due to improved catalyst heat capacity; see U.S. Patent 2,951,815. Thus, for certain purposes a catalyst composition of high particle density is desirable.

During catalytic conversion, such as of high boiling hydrocarbons to lower boiling hydrocarbons, the reaction which takes place is accompanied by a number of complex side reactions, such as aromatization, polymerization, alkylation, and the like. As a result of these complex reactions, a hydrocarbonaceous deposit commonly called "coke" is laid down on the catalyst. The deposition of coke tends to impair catalytic efficiency for the principal reaction. As will be realized, undesired products, such as coke, are formed at the expense of useful products, such as gasoline. It will also be evident that during the period of regeneration, the catalyst is not being effectively employed for conversion purposes. It accordingly is highly desirable not only to afford a large overall conversion of the hydrocarbon charge, i.e., to provide a catalyst of high activity, but also to afford an enhanced yield of useful product, such as gasoline, while maintaining undesired products, such as coke, at a minimum. The ability of a conversion catalyst so to control and to direct the course of conversion is referred to as selectivity. Thus, an exceedingly useful and widely sought characteristic in a cracking catalyst is high selectivity.

In addition to the desirable properties of high activity and selectivity found in commercial catalytic compositions, it is essential for economic use that a catalyst possess high stability, that is, the ability to maintain high levels of activity and selectivity for extended periods of use in catalytic conversion. The maintenance of high selectivity and activity is, therefore, a measure of catalyst stability.

Thus, a modern conversion catalyst necessarily possesses, in addition to high catalytic activity, the equally desirable properties of high attrition resistance, selectivity and stability. Also, modern catalyst may desirably have high particle density and low erosivity. Accordingly, it is a major object of the present invention to provide catalyst compositions exhibiting high catalytic activity and other desirable properties as well. It is a particular object of the present invention to provide catalytic cracking compositions exhibiting high activity, selectivity, stability, density and attrition resistance.

In accordance with the present invention, there has been discovered a novel catalyst composition of extremely high catalytic activity and selectivity, and characterized by extraordinary stability and attrition resistance. Briefly, the present catalyst is a composition of three components: (1) crystalline aluminosilicate particles characterized by an internal structure of rigid three dimensional networks and uniform pores and high catalytic activity; (2) substantially inert fines having a weight mean particle diameter between 0.1 and 10 microns; both contained in and distributed throughout (3) an inorganic oxide matrix therefor, characterized by substantial catalytic activity less than that of the crystalline aluminosilicate component. Ranges of catalytic activity of the three components will be hereinafter specified, and a standard test to measure activity will be described.

Recently a major advance in catalysis has been made by the discovery of extremely active catalyst compositions comprising essentially a crystalline aluminosilicate of ordered internal structure of pores of uniform diameter. The crystalline aluminosilicate may be dispersed in an inorganic oxide matrix to provide a catalyst composite exhibiting both high activity and selectivity as well as superior attrition resistance. Such compositions have been described in U.S. Patents 3,140,249 and 3,140,253, of C. J. Plank and E. J. Rosinski, both patent references incorporated herein by reference.

The present invention resides in an improvement of the aforenoted catalyst composition in which substantially inert fines, of specific physical characteristics, are dispersed within a matrix of substantial catalytic acivity. The discovery of the present invention, then, is that the addition of specific substantially inert fines, particularly defined hereinafter, to a catalyst of a crystalline aluminosilicate of high activity in an inorganic oxide matrix of lesser but substantial activity yields a composite having high catalytic activity, selectivity, density and attrition resistance and, additionally and unexpectedly, extraordinary stability. The improvement in stability, demonstrated in examples presented hereinafter, is especially unexpected in that the fines essentially employed are normally considered catalytically inert.

As noted above a recent major advance in catalysis has been made due to the discovery of extremely active crystalline aluminosilicate catalysts. Crystalline aluminosilicates have been found to be excellent hydrocarbon conversion catalysts, generally, see U.S. Patents 3,140,249, 3,140,251, and 3,140,253. Additionally such composites have been made the subject of issued patents, directed to different chemical conversions, for example: the production of sulfur by direct oxidation of hydrogen sulfide, U.S. Patent 2,971,824; the production of carbonyl sulfide by reaction of carbon monoxide and sulfur, U.S. Patent 2,983,580; and the production of ethylene glycol by the reaction of ethylene oxide and water, U.S. Patent 3,028,434. Also, crystalline aluminosilicate catalysts have been found to have high activity for a wide variety of chemical conversion reactions, such as alkylation and dealkylation, including hydroalkylation (see French Patent 1,379,137), disproportionation, hydrodisproportionation and transalkylation; reforming operations (see French Patents 1,386,551; 1,396,353; and 1,386,552), including isomerization, hydroisomerization, dehydrocyclization and hydroforming; conversion of nitrogen compounds, including production of aryl nitrile from ammonia and alkyl-aromatics (see Canadian Patent 691,207 and British Patent 956,892), urea from carbonyl sulfide and ammonia or amines, or from ammonia and carbon dioxide, aromatic amines by ammonolysis, or from ammonia and carbon monoxide and sulfur, melamine from carbonyl sulfide and ammonia, and ammonia synthesis; oxidation reactions such as the production of ketones from olefins, stilbene and derivatives thereof from mercaptans, alcohols from olefins, aldehydes from paraffins, carboxylic acid from olefins, methanol from hydrogen and carbon oxides, maleic acids from butene, ethers from formaldehyde and the like, carbonyl sulfide from carbon monoxide and sulfur dioxide, low temperature hydration-dehydration, and the like; halogenation and dehalogenation, including the production of vinyl chloride from dichloroethane or from methane, hydrogen chloride and oxygen, hydrohalogenation of olefins; and others, miscellaneous reactions such as polymerization, and automobile exhaust conversion. The above general outline is only a partial listing of the innumerable conversion reactions for which crystalline aluminosilicates have demonstrated high catalytic activity.

Generally, in each of the above applications the crystalline aluminosilicate catalyst exhibits activity substantially greater than that of common commercial catalysts allowing greater charge throughput, less severe operating conditions and generally other favorable operation benefits. The catalyst of the present invention essentially comprises a crystalline aluminosilicate of high catalytic activity, defined as a catalyst of an activity greater than that in normal commerical use. Methods of measuring catalytic activity will be discussed hereinafter. Essentially, also, the catalyst of the present invention comprises an inorganic oxide matrix of substantial catalytic activity, meaning a matrix having catalytic activity sufficent to allow substantial conversion under normal chemical conversion conditions. Essentially, also, the catalyst of the present invention comprises component of substantially inert fines characterized by substantially no catalytic activity, meaning finely divided material having substantially no catalytic activity for the conversion employed by the catalyst under normal conditions of conversion. It has been found, as will be demonstrated by examples included hereinafter, that the novel composition of such a three-component catalyst affords unexpectedly a composition exhibiting high catalytic activity, selectivity and stability. Synergistic results have been observed: Thus, the addition of finely divided inert material to a highly active catalyst composite can afford a catalyst of substantially equivalent activity and unexpectedly of superior selectivity and stability. It has been found essential, however, that the substantially inert fines be added to a catalyst composition comprising a highly active crystalline aluminosilicate and an inorganic oxide matrix of substantial catalytic activity but of lesser activity than said crystalline aluminosilicate. Thus, each of the three components is essential to the discovery of synergism that finds its embodiment in the present invention.

Perhaps the most important commercial application of crystalline aluminosilicate catalysts is in the field of hydrocarbon conversion, particularly catalytic cracking of petroleum stocks to increase the yield of gasoline and other desired products from crude petroleum, see U.S. Patents 3,140,249 and 3,140,253. In the catalytic cracking of hydrocarbons certain active crystalline aluminosilicates have demonstrated activities of greater than 10,000 times that of conventional commercial catalysts presently in use, such as silica-alumina.

In order to measure catalytic activity over such a wide range, a novel test has been devised. The span of activities among the catalysts investigated by the following test is so large that comparison tests of cracking at any standard temperature would result in either conversion too low for analytical determination at one end of the scale, or so close to complete conversion at the other end that no useful measure is attainable. Thus, it was found necessary to crack over relatively inactive catalysts, e.g., a standard silica-alumina cracking catalyst, at relatively high temperatures, and to crack over superactive crystalline aluminosilicate catalysts at relatively low temperatures, in order to effect reasonable conversion. It was found that the relationship between the reaction rate constant for the catalytic cracking of n-hexane, was capable of presentation in a straight line relationship with conversion temperature, assuming a first order reaction. Accordingly, similarities have been found in the slopes of Arrhenius plots (apparent activation energies) of activity among various catalytic compositions, including silica-alumina and various superactive crystalline aluminosilicates. Consequently, it appears justifiable to compare relative activity magnitudes by extrapolation to a standard temperature chosen to be 1000° F. The apparatus employed includes a micro reactor containing 1.5 cc. of the test catalyst in particles of a size in the range of 12–28 mesh or less. By the use of heating elements and temperature measuring devices, it was possible to maintain the reactor bed at substantially constant conversion temperature. A stream of n-hexane in helium at 25° C. was passed over the catalyst at conversion temperature with a 9-second superficial contact time (superficial catalyst volume/gaseous volume flow rate). A sample was collected 5 minutes after reaction commencement and analyzed to determine the fraction of n-hexane cracked to lower boiling hydrocarbons and other products. Conversion temperatures were chosen for accuracy of measurement so that conversion generally was in the range of 5–40 percent.

Conversion may be measured at a specific conversion temperature according to the following relationship:

$$k \sim (1/\tau) \log \frac{1}{1-\epsilon}$$

where $k$ is the reaction rate constant, $\epsilon$ is conversion and $\tau$ is residence time.

A relative rate constant for a particular catalyst composition is defined by:

$$k/k°_{SiAl} = \frac{\tau_{SiAl}}{\tau} \frac{\log \frac{1}{1-\epsilon}}{\log \frac{1}{1-\epsilon°_{SiAl}}}$$

wherein $k/k°_{SiAl}$ is the rate constant relative to a standard silica-alumina cracking catalyst for conversion at 1000° F., $k°_{SiAl}$ being the rate constant for the standard silica-alumina catalyst, $\epsilon°_{SiAl}$ is the conversion for the standard catalyst at 1000° F., and $\tau_{SiAl}$ is the residence time for conversion over the standard catalyst.

It was observed that the relationship of relative activity, $k/k°_{SiAl}$, on a logarithmic ordinate with the inverse of the absolute temperature of conversion on a proportional abscissa was substantially a straight line function. Thus, the activity for a particular component was determined by finding the relative activity for a plurality of temperatures and extrapolating to 1000° F. the above straight-line relationship between relative activity and inverse temperature.

The values for relative activity extrapolated for test catalyst compositions to 1000° F. are hereinafter denominated by the term alpha ($\alpha$). Thus, alpha ($\alpha$) represents the activity of the test catalyst relative to a standard sample of silica-alumina. Accordingly the rate constant alpha ($\alpha$) is relative to the rate constant of a highly active conventional amorphous silica-alumina cracking catalyst obtained by cogelation [see Alexander, J., Proceedings Amer. Pet. Inst., 27 (III), 51 (Nov. 1947)], containing 10 percent by weight alumina and having a surface area of 420 square meters per gram. The standard catalyst has a petroleum gas oil cracking activity substantially in excess of that of contemporary commercial cracking catalysts; its activity, according to an industrially accepted test method is about 46 AI [see Chem. & Met. Eng. 53, 94–98, 138–141 (April 1946)]. The standard catalyst converts by cracking 12.5 percent of n-hexane in a stream of helium, the catalyst being at 1000° F., after 5 minutes of the 9-second superficial contact time.

According to the above test crystalline aluminosilicate components were found to have alphas in the range of between about 0.5 to substantially greater than 10,000. Conventional cracking catalyst and other amorphous materials exhibited alphas generally in the range of about 0.1 to 2.0.

Those skilled in the art will realize that similar tests may be devised to determine relative activities of highly activated components for different catalyst applications. Again it is emphasized that the catalyst of the present invention is suitable for a wide variety of chemical conversion in addition to the specific use as a hydrocarbon conversion catalyst or as a cracking catalyst.

It is also within the scope of the present invention to employ the instant catalyst compositions in conjunction with other catalytic components in conversions requiring a plurality of specific catalyst sites. For example, it is well known in the art that a hydrocracking catalyst composition or a reforming catalyst composition requires essentially both acid catalyst sites and hydrogenation-dehydrogenation catalyst sites. Generally the crystalline aluminosilicates in and of themselves provide excellent acid sites, and in combination with other components, such as hydrogenation-dehydrogenation components may provide multi-component catalyst compositions, such as hydrocracking or reforming catalyst composites.

Briefly, the present invention is directed to a catalyst composition, particularly useful in hydrocarbon conversion, having a sodium content of less than about 4 percent by weight and comprising finely divided crystalline aluminosilicate particles, having uniform pore openings preferably between 3 and 15 Angstrom units in diameter and characterized by high catalytic activity; and substantially inert fines of substantially no catalytic activity, particularly characterized by a weight mean diameter of between about 0.1 and 7 microns; incorporated in and distributed throughout an inorganic oxide matrix characterized by substantial catalytic activity. Generally, the catalyst compositions of this invention comprise by volume between about 1 and 80 percent crystalline aluminosilicate particles, 5 and 80 percent substantially inert fines, and 10 and 80 percent inorganic oxide matrix.

In a more particular embodiment, the present invention is directed to a hydrocarbon conversion catalyst composition containing less than 4 percent sodium by weight and comprising three components: (a) finely divided crystalline aluminosilicate particles characterized by uniform pore openings of between 6 and 15 Angstrom units in diameter and by an alpha ($\alpha$) greater than 2; (b) an inorganic oxide and preferably a siliceous matrix characterized by an alpha ($\alpha$) greater than 0.1, but less than the alpha ($\alpha$) of said crystalline aluminosilicate component; and (c) substantially inert fines selected from the group consisting of $\alpha$-alumina, barytes, zircon, zirconia, kyanite and rutile fines characterized by an alpha ($\alpha$) less than 0.1.

The particle size of the components incorporated in the inorganic oxide matrix generally is substantially uniform depending upon the ultimate catalyst particle size. The crystalline aluminosilicate particles are usually less than 40 microns, and preferably between 0.1 and 10 microns, in weight mean diameter. Correspondingly, the substantially inert fines are characterized by a weight mean diameter of between 0.1 and 10 microns, preferably between 0.1 and 3.0 microns. Ultimate catalyst particles having an average diameter between 1/64 and 1/2 inch, suitable for moving and fixed bed operations, would generally contain component particles of a larger diameter than ultimate catalyst particles of a diameter between about 10 and 100 microns suitable for fluid operation.

Suitable crystalline aluminosilicates for use in the present invention are described in the above-noted U.S. Patent 3,140,249 as well as U.S. Patent 3,140,251, also issued on July 7, 1964, to C. J. Plank and E. J. Rosinski, and incorporated herein by reference. Representative crystalline aluminosilicates suitable for the present invention include those natural and synthetic crystalline aluminosilicates having uniform pores of a diameter preferably between about 3 and 15 Angstrom units. Such crystalline aluminosilicates include zeolites X, Y, A, L, D, R, S, T, Z, E, F, Q, B, ZK–4, ZK–5, as well as naturally occurring zeolites including chabazite, faujasite, sodalite, mordenite and the like. Crystalline aluminosilicates having pore diameters between about 3 and 5 Angstrom units may be suitable for size-selective conversion catalysis, while crystalline aluminosilicates having pore diameters between about 6 and 15 Angstrom units are preferred for hydrocarbon conversion such as catalytic cracking and the like. Preferred crystalline aluminosilicates include synthetic faujasite or zeolites X and Y.

The crystalline aluminosilicate particles employed as a component in the catalyst compositions of the present invention are essentially characterized by a high catalytic activity. As hereinabove defined "high catalytic activity" refers to an activity greater than that in normal commercial use. Thus, high catalytic activity is a term relative to its context, and varies absolutely depending upon the particular employment of the crystalline aluminosilicate, that is in catalytic cracking, reforming, oxidation, halogenation or the like.

This high catalytic activity may be imparted to the particles by base exchanging alkali metal aluminosilicate particles—either before or after dispersion thereof in a suitable matrix—with a base-exchange solution containing ions selected from the group consisting of cations of elements of Groups IB–VIII of the Periodic Table, hydrogen and hydrogen precursors; including mixtures thereof with one another. Hydrogen precursors, such as ammonia and ammonium salts, typically undergo, upon heating, degradation to hydrogen cations in contact with aluminosilicates. Suitable methods of base exchange are described in the aforenoted U.S. Patents 3,140,249 and 3,140,253. Preferably, the crystalline aluminosilicate component for hydrocarbon conversion application is characterized by an alpha ($\alpha$) greater than 2 up to values even greater than 10,000.

Alpha values for certain crystalline aluminosilicates have been determined according to the test procedure described hereinabove. It should be realized that any single composition may exhibit widely varying activities, depending primarily upon method of preparation, exchange cations or the like. Thus, the values presented below are typical single measurements of the activity, representative for each aluminosilicate component.

| Crystalline aluminosilicate: | Alpha ($\alpha$) |
|---|---|
| Synthetic— | |
| Sodium X | 1 |
| Rare earth X [1] | >10,000 |
| Magnesium X [1] | 1.2 |
| Platinum X [2] | 5 |
| Hydrogen X [1] | 50 |
| Zinc X [1] | 12 |
| CoMo rare earth X [3] | 20 |
| Rare earth hydrogen X [1] | >10,000 |
| Titanium hydrogen Y [1] | 5,000 |
| Titanium Y [1] | 0.7 |
| Iron hydrogen Y [1] | >10,000 |
| Hydrogen Y [1] | 5,000 |
| Rare earth hydrogen Y [1] | 7,000 |
| Calcium A [1] | 0.4 |
| Sodium A | 0.1 |
| Rare earth A [1] | 10 |
| Calcium T [1] | 0.4 |
| Calcium S [1] | 0.4 |
| Hydrogen S [1] | >10,000 |
| Hydrogen T [1] | >10,000 |
| Hydrogen L [1] | 300 |
| Natural materials— | |
| Natural crystalline aluminosilicates generally | 0.1–1.1 |
| Hydrogen mordenite [4] | >10,000 |
| Rare earth chabazite [5] | 10 |
| Hydrogen chabazite [4] | >10,000 |
| Hydrogen gmelinite [4] | >10,000 |
| Hydrogen offretite [4] | >10,000 |

[1] Base exchanged sodium zeolites X, Y, etc.
[2] Impregnated sodium zeolite X, etc.
[3] Rare earth base-exchanged, sodium zeolite X impregnated with cobalt oxide, and molybdena.
[4] Base exchanged with hydrogen or hydrogen precursor ions.
[5] Base exchanged with rare earth ions.

From the above lists, it can be seen that natural and synthetic zeolites or crystalline aluminosilicates possess varying activities for n-hexane cracking, some species being more than 10,000 times as active as a high activity silica-alumina. For hydrocarbon conversion processes, preferably the crystalline aluminosilicate component (in the form existing in the final composite) is characterized by an alpha ($\alpha$) greater than 2.

It is pointed out particularly that the crystalline aluminosilicate component, being of high catalytic activity in the final composite, may be relatively less active upon dispersion into the matrix material. Subsequently the crystalline aluminosilicate may be made highly active by base exchange, impregnation or the like, after incorporation into the matrix. By comparison, the activities of the inorganic oxide matrix and substantially inert fines are determined for the components per se. Thus, the activities of the three components of the present catalyst refer to each component activity per se, in its condition (e.g. base exchanged) in the final composite. For example, an alkali metal aluminosilicate, having an alpha ($\alpha$) less than 2 (see above list), may be dispersed in a matrix and thereafter undergo base exchange, impregnation, calcination or other process steps to raise the alpha ($\alpha$) to greater than 2. Similarly, but to a much smaller extent, the alpha ($\alpha$) values of the inorganic oxide matrix component and substantially inert fines may change, subsequent to their combination with the crystalline aluminosilicate, due to the effects of further process steps. In each case, nevertheless, the alpha ($\alpha$) referred to herein, and employed uniformly in the claims, refers to a value for the component per se, which component has undergone all process steps, employed in the preparation of the final composite, followed by the component both alone and in the three-component composite. Thus, to determine the alpha ($\alpha$) of a component, the component per se is subjected by itself to the process steps employed in the preparation of the final composite, both before and after combination with the other components.

Suitable inorganic oxide matrix materials having substantial catalytic activity, including oxides, gels, clays and the like, are also well known and disclosed in the aforenoted patent references and elsewhere. For the present invention it is also preferable to employ a siliceous oxide matrix material, that is a matrix comprising essentially silica, preferably combined, by admixture or cogelation, with an oxide of at least one metal selected from the group consisting of Groups II, III–A, IV–B and VI–B of the Periodic Table. As employed herein, the Periodic Table refers to the standard long form illustrated at page 1680, Webster's Third New International Dictionary, G. & C. Merriam Co., Springfield, Mass. (1961). According to well-known techniques, small amounts of chromia may be added to the matrix beneficially to prevent after-burning. Such compositions include, for example, silica-alumina, silica-magnesia, silica-zirconia, silica-thoria, silica-beryllia, silica-titania as well as ternary combinations such as silica-alumina-thoria, silica-alumina-chromia, silica-alumina-zirconia, silica-alumina-titania, silica-alumina-beryllia, silica-alumina-magnesia and silica-magnesia-zirconia. Preferably the inorganic oxide matrix is silica-alumina gel comprising between about 1 and 20 percent by weight alumina and about 80 and 99 percent by weight silica in the matrix phase.

Values for alpha ($\alpha$) have been determined for several inorganic oxides of substantial catalytic activity suitable for use as a matrix material, according to the method of the invention, in hydrocarbon conversion catalysts. Again, it is pointed out that the values below are typical, single observations and that preparational procedure may affect the catalytic activity substantially.

| Inorganic oxide: | Alpha ($\alpha$) |
|---|---|
| Silica-alumina | 0.2–1.4 |
| silica-alumina-iron impurity | 2.8 |
| Silica-magnesia | 0.1 |
| silica-zirconia | 0.2 |
| silica gel | 0.1 |
| eta-alumina | 1.7 |
| eta-alumina fluoride | 37 |
| chi-alumina | 0.1 |
| colloidal alumina | 0.3 |
| magnesia | 0.1 |
| thoria-alumina | 3.8 |
| zirconia-alumina | 1.3 |

Thus the matrix material may consist of one of the above inorganic oxides or a combination of one or more than one together or combined with other inorganic oxides, the matrix having substantial catalytic activity, preferably characterized by an alpha ($\alpha$) greater than 0.1, but less than the activity of the crystalline aluminosilicate component. The above list of inorganic oxides represents typical values of alpha ($\alpha$) and is, of course, neither restrictive nor exclusive.

As indicated above an essential feature of the present invention resides in the dispersion of particularly characterized substantially inert fines along with highly active crystalline aluminosilicate particles in an inorganic oxide matrix of substantial catalytic activity. It has been found that the employment of substantially inert fines results in a catalyst composition having high activity and attrition resistance, while unexpectedly exhibiting high stability for extended period of commercial use. The fines suitable for the use in the present composition are per se substantially inert catalytically and are characterized by a weight mean diameter between about 0.1 and 10 microns. Substantially inert materials, suitable for use as fines in the present invention include $\alpha$-alumina, zircon (zirconium silicate), barytes (barium sulfate), zirconia, kyanite (naturally-occurring clay), rutile (titanium dioxide) and many other materials. Preferably the fines have a high density of at least 1.5 grams per cc. in order to impart improved density to the final composite. For hydrocarbon conversion catalysis, preferably the fines are characterized by an alpha ($\alpha$) less than 0.1, and a particle density of between 1.5 and 3.0, more preferably higher. In preferred embodiments of the present invention the fines are $\alpha$-alumina characterized by an alpha ($\alpha$) less than 0.1, a weight mean particle size between about 0.1 and 3 microns, a pore diameter of between about 100 and 15,000 Angstrom units, a surface area between about 0.2 and 70 square meters per gram, a particle density between about 1.6 and 3 grams per cubic centimeter or higher and a pore volume between about .24 and .32 cubic centimeter per gram.

Alpha measurements have been made for several substantially inert materials suitable for use in a finely divided state in catalyst compositions of the present invention. Once again it is pointed out that the values below are typical, single observations and that preparational procedure may affect catalytic activity.

| Inert material: | Alpha($\alpha$) |
|---|---|
| $\alpha$-Alumina | ~0 |
| Barytes (barium sulfate) | 0 |
| Zircon | 0 |
| Georgia kaolin | 0 |
| Steamed silica-zirconia | <<0.1 |

Values for alpha ($\alpha$) substantially below 0.1 are incapable of accurate measurement due to the small amount of thermal cracking at 1000° F., which factor would cause greater relative error at higher temperatures and as activity approaches zero. Substantially inert materials suitable as fines for employment herein, accordingly, are defined preferably as having an alpha ($\alpha$) of less than 0.1.

The particle size distributions of the substantially inert fines and crystalline aluminosilicate particles incorporated in the final composite may be suitably determined by sedimentation methods. Weight mean particle diameter ($dw$) is determined by plotting the cumulative percent of powdered material smaller than a given diameter against particle diameter, dividing the total size range into a number of small fractions, and calculating as follows:

$$dw = \text{weight mean diameter} = \frac{\sum d_i g_i}{\sum g_i}$$

where $d_i$ is the mean particle size of the fraction in microns and $g_i$ is the corresponding weight percent material in the fraction.

The attrition characteristics of the catalyst composites prepared in accordance with the method described herein were determined by an attrition test known as the Lauson Shaker Test. The procedure used in the test consists of shaking a 50-cc. sample of the product to be tested in a closed steel cup which is bolted to the piston of a motor-driven Lauson engine which operates at 1000 r.p.m. After shaking for 150 seconds, the catalyst fines passing through a 8 mesh (Tyler) screen are removed and weighed; particles larger than 8 mesh are retained in the cup. The shaker operation is repeated until the fines produced during successive cycles exceed 50 percent by weight of the original sample. The attrition resistance is measured by "LSA" and is defined as the time in seconds required to produce 50 percent by weight of fines according to the above test. Since LSA is affected by the size of the particles tested, the attrition data reported herein unless otherwise defined are corrected by correlation to an average particle diameter of 0.140 inch.

As will be demonstrated in the examples hereinafter set forth, the use of substantially inert fines affords a crystalline aluminosilicate-inorganic oxide catalyst having high activity and selectivity as well as unexpected stability in commercial use. The three components of the hydrocarbon conversion catalyst of the present invention, crystalline aluminosilicate particles, substantially inert fines, and inorganic oxide matrix, may be combined by any suitable method. For example, discrete particles of each component may be admixed with a suitable binder and extruded in pellet form. More suitably, however, it is advantageous to disperse crystalline aluminosilicate particles and substantially inert fines both as hereinabove defined, in an inorganic oxide sol, to effect gelation of said sol, preferably at a pH between about 7.2 and 9.0, to wash free of soluble matter the resulting inorganic oxide gel having crystalline aluminosilicate particles and substantially inert fines dispersed therein, and to calcine the resulting product at a temperature in the range of 500 to 1500° F. for at least ½ hour. Where an alkali metal aluminosilicate is employed initially, it is essential to base exchange either the aluminosilicate particles before or after compositing with the inorganic oxide matrix to reduce the sodium content of the final product to less than about 4 percent by weight and preferably less than 1 percent by weight. The sodium content of the final composite is essentially less than 4 percent by weight; such compositions provide high catalytic activity when zeolite Y is the crystalline aluminosilicate component. Preferably, however, especially when zeolite X is the crystalline aluminosilicate component, the sodium content of the final composite is less than 1 percent by weight.

As discussed above, base exchange may be accomplished by one or more contacts (before and/or after incorporation of the substantially inert fines and crystalline aluminosilicate into the matrix) with a solution comprising ions selected from the group consisting of cations of the elements of Groups I-B—VIII, hydrogen and hydrogen precursors, including mixtures thereof with one another. Generally the inorganic oxide sol is prepared by combining two or more solution streams in a bead-forming tower by well known methods such as those described in U.S. Patent 2,384,946, in which case either or both the crystalline aluminosilicate particles and the substantially inert fines may be added to one or more of the solution streams. Thus, where silica-alumina is the inorganic oxide matrix, crystalline aluminosilicate particles and substantially inert fines may be added to a sodium silicate solution to form a slurry, which slurry may be then combined with an acid alum solution in bead forming equipment to form a silica-alumina hydrogel with crystalline aluminosilicate particles and substantially inert fines dispersed therein. Such hydrogel, thereafter, may undergo further processing steps, as described above, including base exchange, washing and calcination.

It has been found desirable to add dispersing agents with the crystalline aluminosilicate particles and substantially inert fines dispersed into the inorganic oxide sol or component thereof. Thus, it is customary to disperse aluminosilicate particles with lignin sulfonates and fines with polyelectrolytic dispersants into a sodium silicate solution, which solution upon combination with an acid alum solution forms a siliceous hydrosol. Sodium salts of polycarboxylic acids have been found to be effective dispersants for fines suitable for the present invention.

As described above, the composites of the present invention comprising crystalline aluminosilicate particles and particularly defined substantially inert fines incorporated in an inorganic oxide matrix may be in the form of particles, beads, spheroids or pellets. Particles of approximately 1/64 to 1/2 inch diameter are suitable for use in moving or fixed bed catalytic reactors, while smaller particles, of a diameter between about 10 and 100 microns, are suitable for fluid operation. Such catalytic processes are well known and amply described in the art.

The catalyst compositions of the present invention are particularly suitable for conversion of hydrocarbons, and in such preferred utility comprise the components characterized by the following alpha (α) values: crystalline aluminosilicate, greater than 2 up to >10,000 and even higher; inorganic oxide matrix, greater than 0.1 but less than that of the crystalline aluminosilicate component; and substantially inert fines, less than 0.1 For hydrocarbon conversion the components are preferably present in the following proportions, by ranges of volume percent:

| | Volume percent |
|---|---|
| Crystalline aluminosilicate | 1–80 |
| Inorganic oxide matrix | 10–80 |
| Substantially inert fines | 5–80 | for the purpose of uniformity, volume percent values refer to the relative actual volumes occupied by each component in the final catalyst composite; the volume of each component consequently includes vacant space or pores within the component phase.

For the particular function of catalytic cracking of petroleum stocks (fixed-, moving- or fluid-bed) the components are preferably present in the following proportions, by ranges of volume percent:

| | Volume percent |
|---|---|
| Crystalline aluminosilicate | 2–15 |
| Inorganic oxide matrix | 50–75 |
| Substantially inert fines | 10–45 |

For the particular function of catalytic hydrocracking of petroleum stocks, according to processes of the type commercially employed under conditions well-known to the art, the catalyst of the present invention may be combined with a hydrogenation component, either by impregnation, base exchange (preferably followed by reduction of the hydrogenation cation to the metal), admixture or the like, to form a hydrocracking catalyst of exceptional catalytic activity, selectivity and stability, and of excellent physical characteristics. Suitable hydrogenation components may be selected from the group consisting of oxides of metals, sulfides of metals and metals of Groups VI and VIII of the Periodic Table. Representative of these metals are molybdenum, cobalt, chromium, tungsten, iron, nickel, the platinum group metals, as well as combinations of these metals, their oxides or sulfides. The hydrogenation component is present in the final hydrocracking composite comprising by weight between about 0.1 and 25 percent of the composite. Exclusive of the hydrogenation component the other components are present in the following proportions, by ranges of volume percent:

| | Volume percent |
|---|---|
| Crystalline aluminosilicate | 25–80 |
| Inorganic oxide matrix | 10–70 |
| Substantially inert fines | 5–50 |

For the particular function of catalytic reforming of petroleum stocks, according to processes of the type commercially employed under conditions well-known to the art, the catalysts of the present invention may be combined by suitable method with a hydrogenation component, preferably platinum, comprising by weight between about 0.3 and 5.0 percent of the final reforming composite. Exclusive of the hydrogenation component the other components are present in the following proportions, by ranges of volume percent:

| | Volume percent |
|---|---|
| Crystalline aluminosilicate | 10–25 |
| Inorganic oxide matrix | 10–70 |
| Substantially inert fines | 5–60 |

Crystalline aluminosilicate composites have been found to be excellent alkylation catalysts of exceptional activity, particularly for the alkylation of aromatics with olefins. High alkylation activity is imparted in part by calcination at particular temperatures, for example, rare earth zeolite X, at 300–600° C.; rare earth zeolite Y, at 200–400° C.; and hydrogen zeolite Y at 400–650° C. For the particular function of catalytic alkylation the components are preferably present in the following proportions, by ranges of volume percent:

| | Volume percent |
|---|---|
| Crystalline aluminosilicate | 50–80 |
| Inorganic oxide matrix | 10–40 |
| Substantially inert fines | 10–30 |

The above alkylation catalysts are also excellent for isomerization and other related conversions. Alkylation and isomerization may be effected by contact with the above catalysts under conditions well-known to the art, at temperatures below about 600° F.

The following comparative examples serve to illustrate the advantages of the method of the present invention without limiting the same:

*Examples 1–11*

The crystalline sodium aluminosilicate used in these examples was prepared according to the procedure described in U.S. 2,882,244. In Examples 1 through 11, various rare earth aluminosilicate silica-alumina catalysts, with and without inert fines, were prepared utilizing specific proportions of starting materials and conditions as designated in Table I in the following general procedure:

An acid solution containing aluminum sulfate, sulfuric acid and water and a silicate solution containing sodium silicate, water, sodium aluminosilicate, or the same silicate solution with the addition of insoluble fines such as alumina or barium sulfate, were continuously mixed together through a mixing nozzle using the designated relative solution rates of addition. The resulting sol was formed in gel beads at room temperature with a gelation time of about 4.8 seconds at a pH of 8.4.

The resulting gel beads were placed in an aqueous solution containing 0.5 weight percent ammonium chloride and 2 weight percent rare earth chloride containing as its principal constituent cerium chloride, along with the chlorides of praseodymium, lanthanum, neudymium, and samarium, immediately after the gel formed used ½ volume of solution per volume of beads. The rare earth chloride base exchanged was continued for a total of 18 2-hour contacts at room temperature. The base-exchanged gel was then washed continuously until the effluent water was free of sulfate and chloride ions. The washed gel beads were then steam dried at 250–300° F. for 3 hours, calcined in air for 3 hours at 1300° F. and steamed treated for 30 hours at 1200° F. using 100 percent steam at 15 pounds per square inch gauge pressure. The resulting catalyst was then evaluated for cracking characteristics of gas oil. The details of catalyst preparation, catalyst composition and cracking results are set forth in Table I.

In Table I, comparing Examples 2 through 11, with Example 1 describing the results of the silica-alumina catalyst without rare earth aluminosilicate, the catalysts containing rare earth aluminosilicates are vastly superior in cracking activity and selectivity. Comparing Examples 2 and 7 which contain rare earth aluminosilicates but no inert fines the attrition resistance as described by the LSA test are below 1000 and below the attrition resistance of the desired catalysts of the present invention in the remaining Examples 3 through 6 and 8 through 11 which demonstrate the improvement provided in attrition resistance by the addition of the substantially inert fines.

*Examples 12–14*

The crystalline sodium aluminosilicate used in these examples was prepared according to the procedure described in U.S. 2,882,244. In Examples 12–14, various rare earth aluminosilicate silica-alumina catalysts with alumina fines were prepared utilizing conditions similar to those used to prepare the catalysts in Examples 1 through 11. The variable which was changed, however, in the examples is the amount of alumina is the cogelled silica-alumina gel matrix to demonstrate the effect of the presence of a metal oxide such as alumina on the catalyst preparation, the details of catalyst preparation, catalyst composition and cracking results are set forth below in Table II.

TABLE I

| Reactants | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Acid Alum Solution: | | | | | | | | | | | |
| Water [1] | | 93.59 | 93.59 | 93.59 | 93.59 | 93.59 | 93.59 | 93.59 | 93.59 | 93.59 | 93.59 |
| Aluminum sulphate [1] | | 3.47 | 3.47 | 3.47 | 3.47 | 3.47 | 3.47 | 3.47 | 3.47 | 3.47 | 3.47 |
| Sulfuric acid [1] | | 2.94 | 2.94 | 2.94 | 2.94 | 2.94 | 2.94 | 2.94 | 2.94 | 2.94 | 2.94 |
| Specific gravity at 60° F | | 1.057 | 1.057 | 1.057 | 1.057 | 1.057 | 1.057 | 1.057 | 1.057 | 1.057 | 1.057 |
| Solution rate, cc./min | | 418 | 421 | 421 | 420 | 422 | 419 | 416 | 419 | 416 | 413 |
| Fines Silicate Slurry: | | | | | | | | | | | |
| Sodium Silicate ($Na_2O/SiO_2=0.31/1$) [1] | | 46.28 | 44.12 | 44.58 | 45.08 | 45.60 | 46.18 | 43.37 | 43.90 | 44.56 | 45.71 |
| Water [1] | | 47.20 | 46.48 | 46.62 | 46.76 | 46.96 | 49.12 | 46.06 | 46.73 | 47.35 | 48.67 |
| Sodium aluminosilicate [1] | | 6.52 | 1.00 | 2.78 | 3.36 | 4.84 | 4.70 | 0.69 | 1.49 | 2.40 | 3.50 |
| Inert fines [1] α alumina | | | 8.40 | 6.72 | 4.80 | 2.60 | | | | | |
| Barytes | | | | | | | | 9.88 | 7.88 | 5.69 | 2.12 |
| Specific gravity at 60° F | | 1.204 | 1.248 | 1.232 | 1.225 | 1.216 | 1.190 | 1.263 | 1.247 | 1.232 | 1.203 |
| Solution rate, cc./min | | 413 | 413 | 415 | 415 | 415 | 420 | 420 | 422 | 415 | 403 |
| Size of sodium Aluminosilicate [2] | | 6.0 | 6.0 | 6.0 | 6.0 | 6.0 | 5.3 | 5.3 | 5.3 | 5.3 | 5.3 |
| Size of inert fines [2] | | | 4.6 | 4.6 | 4.6 | 4.6 | | 4.2 | 4.2 | 4.2 | 4.2 |
| Composition Finished Catalyst: | | | | | | | | | | | |
| Aluminum oxide,[1] gel matrix | 6.3 | 5.5 | 5.5 | 5.8 | 5.7 | 5.7 | 5.7 | 5.6 | 5.7 | 5.7 | 5.8 |
| Silica,[1] gel matrix | 93.7 | 82.3 | 82.3 | 81.4 | 81.7 | 81.7 | 81.7 | 82.0 | 81.7 | 81.7 | 81.4 |
| Rare earth aluminosilicate [1] | | 31.7 | 4.5 | 9.2 | 15.8 | 21.9 | 25.0 | 3.1 | 6.8 | 12.6 | 18.1 |
| α alumina calcined fines [1] | | | 33.7 | 27.0 | 19.6 | 10.7 | | | | | |
| Barium sulfate fines [1] | 43 | | | | | | | 38.2 | 31.5 | 23.7 | 9.5 |
| Physical Properties: | | | | | | | | | | | |
| Packed density, g./cc | .90 | 0.67 | 0.86 | 0.80 | 0.74 | 0.68 | 0.68 | 0.93 | 0.89 | 0.83 | 0.77 |
| LSA 50% Correction to 0.140 inches, average particle diameter | 1,370 | 500 | 2,350 | 1,500 | 1,700 | 1,050 | 850 | 1,020 | 1,250 | 1,050 | 1,360 |
| Cracking Properties: | | | | | | | | | | | |
| Temperature, °F | 875 | 875 | 875 | 875 | 875 | 875 | 875 | 875 | 875 | 875 | 875 |
| LHSV | 3.0 | 3.0 | 3.0 | 3.0 | 3.0 | 3.0 | 3.0 | 3.0 | 3.0 | 3.0 | 3.0 |
| Catalyst to oil ratio | 2.0 | 2.0 | 2.0 | 2.0 | 2.0 | 2.0 | 2.0 | 2.0 | 2.0 | 2.0 | 2.0 |
| Conversion percent Vol | 24.4 | 72.8 | 45.8 | 63.0 | 66.8 | 72.6 | 74.6 | 42.0 | 51.5 | 60.7 | 66.7 |
| Gasoline, $C_5$ Free percent Vol | 21.9 | 54.8 | 39.3 | 51.7 | 53.2 | 55.3 | 55.3 | 35.1 | 42.2 | 47.9 | 50.5 |
| Total $C_4$'s, percent Vol | 4.4 | 19.4 | 9.3 | 14.7 | 16.2 | 19.6 | 20.3 | 9.4 | 12.2 | 15.7 | 18.3 |
| Dry gas [1] | 1.9 | 6.9 | 3.6 | 5.2 | 5.7 | 6.6 | 7.4 | 3.5 | 4.4 | 5.4 | 6.4 |
| Coke [1] | 1.5 | 5.3 | 1.9 | 3.2 | 3.9 | 4.8 | 5.6 | 2.0 | 2.5 | 3.1 | 4.3 |

[1] Weight percent.
[2] Microns, weight mean particle diameter.

TABLE II

| Reactants | Example | | |
|---|---|---|---|
| | 12 | 13 | 14 |
| Acid Alum Solution: | | | |
| Water [1] | 92.00 | 93.59 | 91.22 |
| Aluminum sulfate [1] | 8.00 | 3.47 | 6.10 |
| Sulfuric acid [1] | | 2.94 | 2.68 |
| Specific gravity at 60° F | 1.054 | 1.056 | 1.082 |
| Solution rate, cc./min | 338 | 427 | 392 |
| Fines Silicate Slurry: | | | |
| Sodium silicate ($Na_2O/SiO_2=0.31/1$) [1] | 43.40 | 45.50 | 41.10 |
| Water [1] | 49.06 | 46.02 | 49.29 |
| Sodium hydroxide [1] | | | 1.67 |
| Sodium aluminosilicate [1] | 1.34 | 1.50 | 1.41 |
| Alumina calcined fines [1] | 6.20 | 6.98 | 6.53 |
| Specific gravity at 60° F | 1.220 | 1.240 | 1.244 |
| Solution rate, cc./min | 432 | 413 | 418 |
| Size of sodium aluminosilicate [2] | 3.3 | 3.3 | 3.3 |
| Size of Calcined fines [2] | 4.3 | 4.3 | 4.3 |
| Forming pH | 8.4 | 8.4 | 8.4 |
| Composition Finished Catalyst: | | | |
| Aluminum oxide,[1] gel matrix | 0 | 5.6 | 8.8 |
| Silicon oxide,[1] gel matrix | 100.0 | 82.0 | 69.4 |
| Rare earth aluminosilicate [1] | 7.6 | 7.0 | 6.5 |
| Calcined fines [1] | 30.7 | 28.1 | 26.0 |
| Physical Properties: | | | |
| Packed density, g./cc | 0.68 | 0.80 | 0.93 |
| LSA corrected to 0.140 inches average particle diameter | 500 | 1,130 | 2,150 |
| Cracking Properties: | | | |
| Temperature, °F | 875 | 875 | 875 |
| LHSV | 3 | 3 | 3 |
| Catalyst to oil ratio | 2.0 | 2.0 | 2.0 |
| Conversion percent vol | 39.2 | 55.1 | 57.3 |
| Gasoline, $C_5$ [2] percent vol | 34.7 | 46.0 | 47.4 |
| Total $C_4$'s, percent vol | 6.8 | 11.8 | 13.2 |
| Dry Gas [1] | 2.6 | 4.3 | 4.8 |
| Coke [1] | 1.9 | 2.9 | 3.1 |

[1] Weight percent.
[2] Microns, weight mean particle diameter.

In Table II, the catalyst prepared in Example 18 with a silica gel matrix only was found to possess relatively poor attrition resistance properties. Adding a metal oxide such as alumina in the silica gel matrix such as demonstrated in Examples 13 and 14 improved attrition resistance and provided catalysts having excellent hydrocarbon conversion and activity properties. In a similar manner, at least one metal selected from the group of metals from Group II, III-A, IV-B and VI-B of the Periodic Table can be substituted for alumina or used in conjunction with alumina to provide the improved results obtained in the preferred Examples 13 and 14. Such siliceous oxide compositions are preferred to provide attrition resistance for catalyst composites used in moving bed reactors.

*Examples 15–21*

In Examples 15–21 various catalysts of silica-alumina or combined rare earth aluminosilicate and silica-alumina, with substantially inert fines, are prepared utilizing reaction conditions and specific proportions of starting materials to obtain the catalyst composites as designated in Table IIa according to the following general procedure:

An acid solution containing aluminum sulfate, sulfuric acid and water and a silicate solution containing sodium silicate, water, rare earth aluminosilicate having a weight mean particle diameter of 4 microns, or the same silicate solution with the addition of insoluble fines such as alumina or barium sulfate having a weight mean particle diameter of 4 microns, are continuously mixed together through a mixing nozzle using the appropriate relative solution rates of addition. The resulting sol is formed in gel beads at room temperature at a gelation time of about 4 to about 7 seconds at various pH's.

The resulting gel beads are placed in aqueous solution containing from about 1 to about 10 weight percent ammonium sulfate immediately after the gel formed using ½ volume of solution per volume of beads. The ammonium sulfate base exchange is continued for a total of 9 to 18 2-hour contacts at room temperature, to reduce the sodium content of the gel to below about 1 weight percent. The base exchange gel is then washed continuously with water until the effluent water is free of sulfate ions. The washed gel beads are then steam dried at 250–340° F. for 4 hours, calcined in air for 3 hours at 1300° F. and steam treated for 24 to 30 hours at 1200° F. using 100 percent steam at 0–15 pounds per square inch gauge. The resulting catalyst is evaluated for cracking characteristics of gas oil. The details of catalyst composition and cracking results are set forth below in Table IIa:

earth aluminosilicate) the catalysts containing rare earth aluminosilicates are superior in cracking conversions. It should be further noted that the catalyst of Example 19, having its gel formation at a pH of 7.0, produced a less active and less selective catalyst than those prepared by the process of the present invention, but one of high attrition resistance, while the catalyst of Example 21, having its gel formation at a pH of 9.0, produced an active and highly selective catalyst but has an attrition resistance below 1000.

As indicated above and illustrated in the examples which follow, the present invention embodies the discovery that a crystalline aluminosilicate of high activity in an inorganic oxide matrix of substantial catalytic activity in a catalyst having high catalytic activity, selectivity, attrition resistance and stability, may be produced by the addition of particularly defined, substantially inert fines. The method of the present invention may be better understood by the follow examples, which will serve to illustrate the totally unexpected results of the present invention.

Examples 22–29 illustrate the unexpected benefits achievable by the addition of specified quantities of the particular, substantially inert, fines suitable for use in the present invention. Briefly, a comparison is made of the physical and catalytic characteristics of the catalyst compositions of the present invention with other catalysts commercially employed for the catalytic cracking of petroleum streams. Two catalyst compositions, denominated Catalysts C and D are compared. Catalyst C is a type of catalyst containing a rare earth crystalline X aluminosilicate (REX), in the absence of added inert fines, incorporated in a silica-alumina matrix. Catalyst D is a composition of the present invention comprising REX particles and substantially inert α-alumina fines in a silica-alumina matrix. In fact, the only substantial difference between Catalyst C and Catalyst D is the addition of substantially inert fines according to the method of the present invention. It will be shown, quite unexpectedly, that the addition of substantial quantities of inert fines to catalysts like Catalyst C increases selectivity and stability. Thus, according to the method of the invention, the addition of inert fines to a composite of a highly active crystalline aluminosilicate and a matrix of substantial activity effects the benefits of greater gasoline yield and longer catalyst life.

Each of the above catalysts was evaluated by a standard test, denominated the CAT-D test. The CAT-D test basically involves cracking over a test catalyst a Wide Range Mid-Continent Gas Oil at about 875° F., a liquid TABLE IIa

| Examples | 15 | 16 | 17 | 18 | 19 | 20 | 21 |
|---|---|---|---|---|---|---|---|
| Catalyst Composition: | | | | | | | |
| Aluminum oxide,[1] gel matrix | 6.3 | 6.1 | 10.5 | 10.5 | 10.5 | 6.8 | 9.8 |
| Silica,[1] gel matrix | 93.7 | 93.9 | 89.5 | 89.5 | 89.5 | 93.2 | 90.2 |
| Rare earth aluminosilicate [1] | | 7.1 | 4.8 | 4.9 | 5.0 | 6.7 | 5.0 |
| Alumina calcined fines [1] | 43 | 32.3 | | | 35.9 | 31.1 | 36.1 |
| Barium sulfate fines [1] | | | 33.1 | 38.0 | | | |
| Forming pH | 8.4 | 8.4 | 8.1 | 8.1 | 7.0 | 7.2 | 9.0 |
| Gelation time, sec | 5.0 | 5.4 | 5.5 | 5.5 | 5.0 | 5.0 | 5.2 |
| Physical Properties: | | | | | | | |
| Packed density, g./cc | .90 | .82 | 1.01 | 1.06 | 1.09 | 0.93 | 0.80 |
| LSA 50% correction to 0.140 inch-average particle diameter | 1,370 | 1,080 | 1,590 | 2,950 | 2,150 | 1,070 | 875 |
| Cracking Properties: | | | | | | | |
| Temperature, °F | 875 | 875 | 875 | 875 | 875 | 875 | 875 |
| LHSV | 3.0 | 3.0 | 3.0 | 3.0 | 3.0 | 3.0 | 3.0 |
| Catalyst to oil ratio | 2.0 | 2.0 | 2.0 | 2.0 | 2.0 | 2.0 | 2.0 |
| Conversion, Percent Vol | 24.4 | 44.2 | 42 | 43 | 35.6 | 59.5 | 43.8 |
| Gasoline, C₄ free percent Vol | 21.9 | 38.7 | 35 | 36 | 29.5 | 50.5 | 39.1 |
| Total C₄'s, percent Vol | 4.4 | 9.3 | 8.4 | 9.3 | 7.2 | 12.5 | 11.7 |
| Dry gas [1] | 1.9 | 3.6 | 3.5 | 3.5 | 3.2 | 4.6 | 2.6 |
| Coke [1] | 1.5 | 1.7 | 2.0 | 2.0 | 1.9 | 2.9 | 2.6 |

[1] Weight percent.

In Table IIa, comparing Examples 16 through 21 with Example 15 (describing the results of the silica-alumina catalyst containing alumina fines without rare hourly space velocity of 3, with a catalyst to oil ratio of 2; and is described in a report by K. M. Elliott and S. C. Eastwood, "A New Cracking Catalyst-Durabead 5," 1962 A.P.I. Refining Division Meeting, San Francisco (May 1962).

Essentially, each catalyst was tested for selectivity by a product analysis at various conversion rates and the catalysts were compared by product distributions at constant conversion. In the tables that follow a delta Δ is indicated to show product distribution variances between the catalysts. Accordingly, Δ is used to indicate the quantity of a specified product for Catalyst D minus the quantity of that product under identical conversion levels for Catalyst C. By this means selectivity advantages and disadvantages may be readily compared. As is well known in the art, a selectivity advantage for gasoline in a cracked product of as little as 1 percent may be extremely beneficial and demonstrate a catalyst of substantial superiority for commercial operations.

The principles and advantages of the present invention will be more fully understood by consideration of comparative results shown in the attached drawings wherein:

FIGURE 1 is a product distribution comparison for Catalysts C and D under various conversion levels, for the product yields by volume percent of $C_4$-free gasoline.

Figure 2:
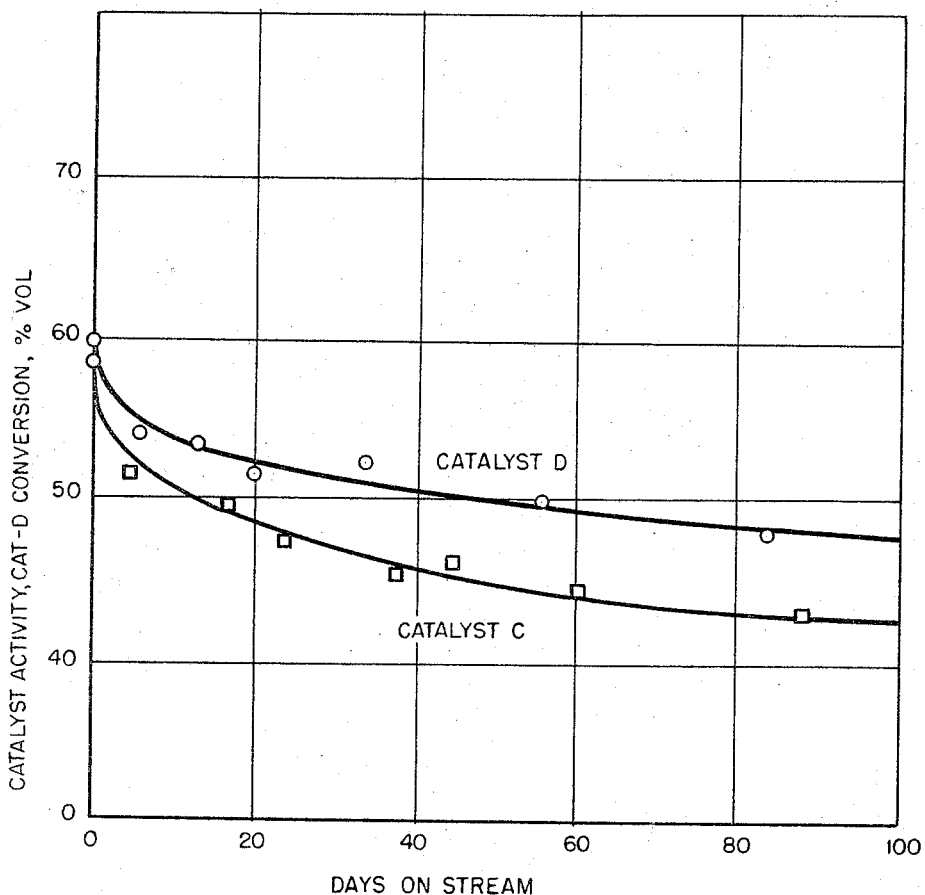

FIGURE 2 demonstrates the unexpected stability of the catalyst of the present invention, by a comparison of catalytic activity over an extended period in commercial use for Catalysts C and D.

Examples 22–24 illustrate the preparation of catalyst composites of the aforenoted types, i.e. Catalysts C and D, an examination of their stability to steam and high temperature, and a comparison of the selectivity of the composites of the present invention with the selectivities of crystalline aluminosilicate catalysts presently in commercial use.

*Example 22*

Samples of Catalyst C were prepared by dispersing rare earth crystalline X aluminosilicate (REX) particles and recycle fines in a sodium silicate solution, combining with an acid alum solution to form a hydrosol, introducing the hydrosol, in the form of globules, to an oil medium contained in a forming tower wherein the globules of sol undergo gelation to gel beads, base exchanging the gel beads with an ammonium sulfate solution to reduce the sodium content of the composite to below 4 percent, washing and calcining the base-exchanged product. Catalysts of various activities were prepared by varying the REX content of the final composite.

In the final Catalyst C product the combined REX particles and recycle fines totaled about 23–24 percent by weight; thus a composite containing 10 percent REX also contained about 13.5–14.5 recycle fines, while a 4.5 percent REX composite contained about 19–20 percent recycle fines. The finished Catalyst C product contained less than 4 percent sodium and about 10.5 percent alumina. The recycle fines, of course, were of the same composition as the final catalyst product.

More specifically the hydrosol was formed by combining, in a nozzle, solutions and slurries in the following volume ratios, dependent upon REX content (in percent by weight) desired in the final Catalyst C composite:

| | | | |
|---|---|---|---|
| Acid Alum solution | 1.000 | 1.000 | 1.000 |
| Sodium Silicate Solution | 0.853 | 0.853 | 0.853 |
| REX Slurry | 0.041 | 0.059 | .087 |
| Recycle Fines Slurry | 0.199 | 0.180 | 0.151 |
| Catalyst C REX Content | 4.0 | 5.8 | 10.0 |

The acid alum solution contained by weight 90.91 percent $H_2O$, 5.80 percent aluminum sulfate (mol. wt.= 342), and 3.29 percent $H_2SO_4$ (100%); and had a specific gravity (@ 60° F.) of 1.085. The sodium silicate solution contained by weight 54.65 percent Q-brand sodium silicate, 42.88 percent $H_2O$ and 2.47 percent NaOH; and had a specific gravity (@ 60° F.) of 1.227. The REX slurry contained 20 percent REX particles by weight in 80 percent $H_2O$. The recycle fines slurry also contained 80 percent water with 20 percent fines and had a specific gravity of 1.142. Combination of the solutions and slurries in the above volume ratios yielded Catalyst C composites containing between 4.0 and 10.0 percent REX. As described above the REX content was varied to give Catalyst C composites of different activity, procedurally by adjustment of the REX slurry: recycle fines slurry ratio.

Beads were formed by dropping hydrosol globules into a forming oil at 80° F. in a tank. The hydrosol had a pH of 8.0 and a temperature of 54° F. initially. Gelation was effected in 5 seconds during gravity flow through the forming oil, the gel being at an average temperature of 64° F.

The gel beads were scrubbed free of adhering forming oil and base exchanged with a 2 percent ammonium sulfate solution to reduce the sodium content thereof to below 4 percent by weight; preferably to below 1 percent. Such exchange was effected at about room temperature by 12 2-hour contacts with fresh base-exchange solution. The base-exchanged beads were then washed with water at room temperature until the wash effluent was substantially free of sulfate ions.

The washed beads were dried in air at 275° F. for about 6 hours and then calcined by steam tempering in an atmosphere of 98 percent steam at 1325° F. for about 16 hours.

*Examples 23 and 24*

Catalyst D composites were prepared according to the method of the present invention. Substantially inert α-alumina fines and active REX fines were dispersed in a sodium silicate solution with added chemical dispersants to form a fines-silicate solution. For these and the following examples, recycle fines of Catalyst D were not added to the fines-silicate solution, as was the procedure for Catalyst C. However, it is within the scope of the invention to add recycle fines to comprise up to about 5 percent or more of the final catalyst of the present invention.

The fines-silicate solution was combined with an acid alum solution to effect a silica-alumina hydrosol containing the α-alumina and REX fines. Gelation was then effected. The resulting hydrogel was scrubbed free of adhering oil from the forming tower with ammonium sulfate solution and then base exchanged with a similar solution to remove zeolitic sodium, washed and dried. One batch of each dried Catalyst D to be analyzed for physical properties was calcined for 3 hours in air at 1300° F. A second batch was calcined for 24 hours at 1200° F. and 15 p.s.i.g. in 100 percent steam to be analyzed for catalyst properties. Two composites were prepared, one (Example 23) containing 10 percent REX fines by weight based on the final catalyst composite, the other (Example 24) containing 4.5 percent REX fines.

More specifically a slurry of REX particles and a slurry of α-alumina fines were combined in a mixed fines slurry, which latter slurry was added to a sodium silicate solution. The hydrosol was formed by combining in a mixing nozzle said fines-containing sodium silicate solution and an acid alum solution. The slurries and solutions were combined in the following relative volumes, dependent upon the desired REX content of the final Catalyst D:

| Example | 23 | 24 |
|---|---|---|
| Catalyst D REX Content, Percent Weight | 10.0 | 4.5 |
| Catalyst D α-alumina Content, Percent Weight | 31.0 | 36.5 |
| Acid Alum Solution | 1.000 | 1.000 |
| Sodium Silicate Solution | 0.646 | 0.646 |
| REX Slurry | 0.123 | 0.055 |
| α-Alumina Slurry | 0.229 | 0.270 |

The acid alum solution contained by weight 89.02 percent $H_2O$, 6.37 percent aluminum sulfate (mol. wt.=342) and 4.61 percent $H_2SO_4$ (100%); and had a specific gravity (@ 60° F.) of 1.10. The sodium silicate solution contained by weight 61.14 percent Q-brand sodium silicate, 32.85 percent $H_2O$ and 6.01 percent NaOH; and had a specific gravity (@ 60° F.) of 1.312. The REX slurry contained by weight 19.98 percent REX particles, 0.12 percent Marasperse N, a dispersant, and 79.90 percent $H_2O$; and had a specific gravity (@ 77° F.) of 1.165. The $\alpha$-alumina slurry contained by weight 29.91 percent $\alpha$-alumina, 0.30 percent Darvan 7, a dispersant, and 69.79 percent $H_2O$; and had a specific gravity (@ 60° F.) of 1.289. The mixed fines slurry to produce a 4.5 percent REX Catalyst D contained by weight 15.58 percent of the REX slurry and 84.42 percent of the $\alpha$-alumina slurry; and had a specific gravity (@ 60° F.) of 1.276. To produce a 10.0 percent REX Catalyst D, the mixed fines slurry contained by weight 32.57 percent of the REX slurry and 67.43 percent of the $\alpha$-alumina slurry; and had a specific gravity (@ 60° F.) of 1.253.

Beads were formed by dropping hydrosol globules into forming oil at 76° F. in a tank. The hydrosol had a pH of 8.0 and a temperature of 57° F. initially. Gelation was effected in 4 seconds during gravity flow through the forming oil, the gel being at an average temperature of 67° F.

The gel beads were scrubbed free of adhering forming oil and base exchanged with a 2 percent ammonium sulfate solution to reduce the sodium content thereof to below 4 percent by weight, preferably to below 1 percent. Such exchange was effected at about room temperature by 12 2-hour contacts with fresh base-exchange solution. The base-exchanged Catalyst D beads were then washed with water at room temperature until the wash effluent was substantially free of sulfate ions.

The washed beads were dried in air at 275° F. for about 6 hours. Dried beads to be analyzed for physical properties were calcined in air for 3 hours at 1300° F. Dried beads to be evaluated as described immediately hereinafter were calcined by steam tempering in a 100 percent steam atmosphere at 1200° F. and 15 p.s.i.g. for 24 hours. Dried beads for commercial use (see below, Examples 28 and 29) were steam tempered in 98 percent steam at 1290° F. for 16 hours.

The Catalyst D composites of Examples 23 and 24 were evaluated for steam stability and thermal stability and the results are shown in Table III. Additionally each composite was subjected to the CAT–D test, described hereinabove, and the product yields compared with the yields at identical conversion using a standard Catalyst C, the conversion level of which was varied according to final REX content.

It should be noted that physical properties suitable for commercial catalysts desirably include an attrition resistance of at least 1500 LSA, a diffusivity of about 20–30 $(cm.^2/sec.)10^3$, and a packed density greater than about 0.86 g./cc. The diffusivity of the catalyst is a measure of the ability of fluids to diffuse therethrough and is determined by measuring the rate at which hydrogen under a constant partial pressure, at essentially atmospheric conditions, will pass through a single catalyst particle having a size of 5 to 6 mesh (Tyler). The diffusivity is the average of such determinations on fifteen particles and is expressed as cubic centimeters of hydrogen per centimeter of catalyst per second $\times 10^3$.

TABLE III.—STABILITY EVALUATION OF CATALYST D

| | Catalyst D Containing 10% REX (Example 23) | | | | | Catalyst D Containing 4.5% REX (Example 24) | | | | |
|---|---|---|---|---|---|---|---|---|---|---|
| | Steam Stability | | | Thermal Stability | | Steam Stability | | | Thermal Stability | |
| Treatment: | | | | | | | | | | |
| Time, Hr | 3 | 24 | 5 | 24 | 24 | 3 | 24 | 5 | 24 | 24 |
| Temp., °F | 1,300 | 1,200 | 1,200 | 1,575 | 1,200 | 1,300 | 1,200 | 1,200 | 1,575 | 1,200 |
| Pressure, p.s.i.g | 0 | 15 | 100 | 0 | 15 | 0 | 15 | 100 | 0 | 15 |
| Steam Concentration | 0 | 100 | 100 | 5 | 100 | 0 | 100 | 100 | 5 | 100 |
| Chemical Composition: | | | | | | | | | | |
| Gel Phase (Gel Phase Basis): | | | | | | | | | | |
| $SiO_2$, Percent Weight | 87.6 | | | | | 87.6 | | | | |
| $Al_2O_3$, Percent Weight | 12.2 | | | | | 12.2 | | | | |
| $Cr_2O_3$, Percent Weight | 0.2 | | | | | 0.2 | | | | |
| Fines Phase (Total Cat. Basis): | | | | | | | | | | |
| REX, Percent Weight | 10.0 | | | | | 4.5 | | | | |
| Total Fines, Percent Weight | 43.0 | | | | | 43.5 | | | | |
| Na, Percent Weight | 0.22 | | | | | 0.13 | | | | |
| $RE_2O_3$ | 2.33 | | | | | 1.10 | | | | |
| $SO_4$, Percent Weight | 0.06 | | | | | 0.03 | | | | |
| Physical Properties: | | | | | | | | | | |
| Packed Density, g./cc | 0.80 | 0.81 | 0.84 | 0.87 | 0.88 | 0.84 | 0.84 | 0.85 | 0.85 | 0.87 |
| 50% LSA (Corr.), sec | 2,470 | | | | | 2,100 | | | | |
| Diffusivity $(cm.^2/sec.)10^3$ | 15.0 | 28.0 | 40.2 | | 31.1 | 13.8 | 28.6 | 35.9 | | 29.6 |
| Surface Area, $m.^2/g$ | | 121 | 73 | | 91 | | 101 | 57 | | 69 |
| Cat-D: | | | | | | | | | | |
| Conversion, Percent Vol | | 63.6 | 54.9 | | 49.4 | | 56.7 | 47.0 | | 32.8 |
| | | △C | △C | | △C | | △C | △C | | |
| $C_5$ plus Gasoline, Percent Vol | | 52.6 / +2.4 | 46.2 / +1.8 | | 43.6 / +3.5 | | 47.8 / +2.2 | 40.2 / +2.0 | | 28.4 |
| $C_4$, Percent Vol | | 12.6 / −3.6 | 11.4 / −2.0 | | 8.9 / −3.2 | | 12.0 / −2.0 | 10.0 / −1.5 | | 6.8 |
| Dry Gas, Percent Weight | | 5.2 / −0.6 | 4.4 / −0.4 | | 3.5 / −0.9 | | 4.4 / −0.6 | 3.5 / −0.7 | | 2.5 |
| Coke, Percent Weight | | 3.1 / −0.2 | 2.3 / −0.3 | | 2.1 / −0.1 | | 3.3 / −0.4 | 1.7 / −0.4 | | 1.7 |

FIGURE 1 illustrates gasoline yields from cracking a Wide Range Mid-Continent Gas Oil at varying conversion levels according to the CAT–D test using Catalysts C and D. The conversion level for Catalyst C was varied by changing the active REX content of the catalyst. The points used for the curve for Catalyst D on FIGURE 1 correspond to the compositions of Table III. Conversion over both Catalysts C and D was at 875° F., 3.0 L.H.S.V. and a 2:1 catalyst:oil ratio.

An analysis of the results shown in Table III and FIGURE 1 readily demonstrates the high selectivity of Catalyst D, compared with Catalyst C at identical conversion levels. Thus, Catalyst D generally produces a $C_5^+$ gasoline advantage over Catalyst C of between about 1.2 and 1.5 percent by volume over the conversion range shown in FIGURE 1. This selectivity advantage over Catalyst C is quite unexpected since the essential difference in composition between Catalysts C and D is attributable basically to the presence of α-alumina fines, which fines per se are substantially inert catalytically and would therefore be expected not to affect the product distribution upon addition to catalyst compositions.

In Examples 25–27 a comparison is made of the physical properties of three Catalyst D composites to demonstrate the superiority of catalysts of the present invention.

*Examples 25–27*

Three composites of Catalyst D were prepared according to the method of the present invention, as detailed in Table IV. The physical properties of the catalysts of Examples 25–27 are also shown in Table IV.

Examples 28 and 29 illustrate the results of an evaluation of the catalyst composites of the present invention in commercial operation. The catalysts were found to have unexpectedly high stability, as compared with similar catalysts in which the substantially inert α-alumina was absent.

*Example 28*

Catalyst D beads were prepared according to the methods of Examples 23 and 24 for commercial use in two batches, one batch of Catalyst D containing 4.5 percent REX and another batch of Catalyst D containing 10 percent REX. The properties of the fresh catalyst are summarized in Table V, including the evaluation of fresh catalyst in the CAT–D test. Small amounts of chromia, effective in reducing afterburning, were present in the Catalyst C and D bead matrix. Approximately 280 tons of the Catalyst D containing 4.5 percent REX were added to a refinery Thermofor Catalytic Cracking (TCC) unit in a makeup rate of about 10 tons per day. Thereafter the Catalyst D containing 10 percent REX was added in normal makeup rates of about 2 tons per day.

TABLE IV

| | Example | | |
|---|---|---|---|
| | 25 | 26 | 27 |
| Catalyst | D | D | D |
| Catalyst Composition: | | | |
| Gel Phase, Percent Weight | 58.4 | 66.5 | 63.5 |
| $Al_2O_3$ | 6.78 | 6.65 | 7.87 |
| $SiO_2$ | 51.62 | 59.85 | 55.63 |
| Fines, Total, Percent Weight | 40.6 | 33.5 | 36.5 |
| α-Alumina | 30.0 | 26.0 | 26.0 |
| REX | 10.6 | 7.5 | 10.5 |
| $RE_2O_3$, Percent Weight | 2.7 | 2.0 | 2.7 |
| Fines size, dw., μ, REX | 3.8 | 4.0 | 4.2 |
| Other | 0.6 | 1.6 | 1.1 |
| Forming Conditions: | | | |
| Sol pH | 8.2 | 7.9 | 8.5 |
| Sol Temp., °F | 64 | 56 | 64 |
| P.C., Percent Weight [1]: | | | |
| Gel Phase | 8.4 | 8.3 | 8.2 |
| Finished Catalyst | 14.4 | 12.4 | 12.9 |
| NaOH/Gel Oxides | 0.16 | 0.16 | 0.29 |
| Forming Solutions Composition and Flow Rates Acid Alum: | | | |
| $H_2O$, Percent Weight | 89.02 | 90.91 | 89.02 |
| $Al_2(SO_4)_3$, Percent Weight | 6.37 | 5.80 | 6.37 |
| $H_2SO_4$, Percent Weight | 4.61 | 3.29 | 4.61 |
| Specific Gravity at 60° F | 1.099 | 1.0835 | 1.0990 |
| Flow Rate, cc./min | 386 | 349 | 364 |
| Fines-Silicate: | | | |
| $H_2O$, Percent Weight | 80.63 | 74.21 | 81.40 |
| $SiO_2$, Percent Weight | 13.46 | 11.77 | 13.36 |
| $Na_2O$, Total, Percent Weight | 7.74 | 4.24 | 7.600 |
| NaOH, Percent Weight [2] | 4.49 | 0.76 | 4.46 |
| Fines, Total, Percent Weight | 11.33 | 8.68 | 8.76 |
| α-Alumina | 8.57 | 7.09 | 6.16 |
| REX | 2.76 | 1.59 | 2.60 |
| Marasperse "N," Percent Weight [3] | 0.6 | 0.6 | 0.6 |
| Darvan 7, Percent Weight [4] | 1.3 | 0.05 | 1.3 |
| Specific Gravity at 60° F | 1.324 | 1.252 | 1.289 |
| Flow Rate, cc./min | 332 | 410 | 326 |

TABLE IV—Continued

| | Example | | |
|---|---|---|---|
| | 25 | 26 | 27 |
| Catalyst | D | D | D |
| Wet Processing: | | | |
| Base Exchange: | | | |
| No Stages:Hr./Stage | 12:2 | 12:2 | 12:2 |
| Solution Composition $(NH_4)_2SO_4$ | 2.1 | 1.4 | 2.1 |
| Temp., °F | RT | RT | RT |
| Vol. Soln/Vol. Hydrogel | 1/2 | 1/2 | 1/2 |
| Water Wash Rate, cc. $H_2O$/Gal. Beads/min | 100 | 100 | 100 |
| Temp. °F [5] | RT | RT | RT |
| Physical Properties: | | | |
| Packed Density, gm./cc | 0.83 | 0.76 | 0.86 |
| Diffusivity (cm.²/sec.) 10³ | 14.9 | 28.9 | 10.7 |
| 50% LSA Sec. (Cor. 0.140" APD) | 2,100 | 2,150 | 2,750 |
| Avg. Particle Dia., In | 0.130 | 0.147 | 0.127 |

[1] Product Concentration: Gel Phase, [$(SiO_2+Al_2O_3)/(H_2O+SiO_2+Al_2O_3)$]×100; Finished Catalyst, [$(SiO_2+Al_2O_3+Fines)/(H_2O+SiO_2+Al_2O_3+Fines)$]×100.
[2] NaOH added (included in total $Na_2O$).
[3] Marasperse "N" weight percent of REX, a dispersent.
[4] Darvan 7 wt. percent of A-3, a dispersent.
[5] Drier Operation 270/340° F. Steam Atmosphere 4½–5 Hours. Calcination 3 Hr., 1300° F. 3 Vol. Air/Vol. Cat/Min.

TABLE V.—PROPERTIES OF FRESH CATALYST D

| REX in Catalyst D, percent weight | 4.5 | 10 |
|---|---|---|
| Composition, percent weight: | | |
| α-Alumina in Catalyst, percent weight | 39.0 | 33.0 |
| Chromia ($Cr_2O_3$), percent weight | 0.2 | 0.2 |
| Rare Earth Oxide ($RE_2O_3$), percent weight | 1.1 | 2.3 |
| Physical Properties: | | |
| Loose Density, g./cc | 0.76 | 0.75 |
| Packed Density, g./cc | 0.85 | 9.83 |
| LSA, Sec | 2,100 | 2,450 |
| Diffusivity, (cm.²/sec.)×10³ | 27 | 28 |
| CAT–D Activity Evaluation (3 S.V., 2 C/O, 875° F.): | | |
| Conversion, percent vol | 49.9 | 58.9 |
| $C_4$-Free 356° F. at 90% Gasoline, percent vol | 42.2 | 47.5 |
| Total $C_4$, percent vol | 10.3 | 13.6 |
| Dry Gas, percent weight | 3.7 | 4.9 |
| Coke, percent weight | 2.6 | 3.3 |

At various periods, samples were taken and the Catalyst D beads separated from the Catalyst C beads originally in the TCC unit. FIGURE 2 is an aging curve comparing the catalyst activity, measured by the standard CAT–D conversion test, of the Catalysts C and D used in the TCC unit of the refinery for a period of nearly 100 days on stream. It is noted that the stability of Catalyst D is unexpectedly superior to that of Catalyst C, with a superiority in catalyst activity of about 5 percent conversion over much of the test period. Table VI also presents the results of the commercial evaluation in a comparison of activity and selectivity, measured by the standard CAT–D test, of Catalysts D and C. The yields shown in Table VI demonstrate the superiority in selectivity of the Catalyst D over that of Catalyst C. It would appear that the improvements of Catalyst D with respect to Catalyst C are directly attributable to the incorporation of the α-alumina fines into the catalyst composition. Since the alumina fines per se are substantially inert catalytically, the improvement in stability and activity resulting from their incorporation is totally unexpected.

*Example 29*

The catalyst of the present invention was again employed for catalytic cracking in a TCC unit. Side-by-side comparison of 35 tons of Catalyst D and 55 tons of Catalyst C was made without addition of makeup catalyst. The results of this example are presented in Table VII wherein a comparison of Catalysts C and D,

TABLE VI.—PROPERTIES OF CATALYST D AGED IN THE REFINERY TCC UNIT

| Days in TCC Unit | 0 | 31 | 42 | 49 | 60 | 103 | 116 | 130 | 148 | 166 |
|---|---|---|---|---|---|---|---|---|---|---|
| REX in Catalyst, percent weight | 4.5 | 4.5 | 10 | 10 | 10 | 10 | 10 | 10 | 10 | 10 |
| Rate of Catalyst Addition, T/D[1] | | 10 | 2.4 | 1.9 | 1.9 | 2.0 | 1.3 | 1.3 | 1.3 | 1.3 |
| Catalyst D in Unit, percent weight (Sample Composition) | 0 | 40 | | | 47 | | | | 67 | 72 |
| Properties of Total Unit Catalyst, Loose Density, g./cc. | 0.74 | 0.75 | 0.77 | 0.76 | 0.76 | 0.79 | 0.76 | | | |
| CAT-D Activity Evaluation: | | | | | | | | | | |
| Conversion, percent Vol | 40.2 | 44.8 | 45.2 | 41.8 | 43.9 | 43.4 | 45.0 | | 47.3 | 50.8 |
| C4-Free 356° F. at 90% Gasoline, percent Vol | 34.7 | 39.0 | 38.4 | 36.0 | 37.4 | 36.9 | 39.4 | | 40.3 | 44.5 |
| Total C4, percent Vol | 8.0 | 8.1 | 9.4 | 8.4 | 9.0 | 8.9 | 8.2 | | 9.7 | 8.7 |
| Dry Gas, percent weight | 3.0 | 3.1 | 3.5 | 3.3 | 3.3 | 3.4 | 3.1 | | 3.6 | 3.3 |
| Coke, percent weight | 2.2 | 2.2 | 2.2 | 2.1 | 2.2 | 2.2 | 2.3 | | 2.2 | 2.1 |
| Properties of Catalyst D in Unit: | | | | | | | | | | |
| Loose Density, g./cc. | | | | | 0.80 | | 0.79 | 0.76 | | 0.79 |
| $RE_2O_3$, percent weight | | | 1.35 | | | 1.57 | | | | |
| CAT-D Activity Evaluation: | | | | | | | | | | |
| Conversion, percent Vol | | 50.6 | 48.5 | 48.8 | | 52.6 | 51.2 | 52.0 | 50.1 | |
| C4, Free 356° F. at 90% Gasoline, percent Vol | | 42.5 | 40.4 | 40.0 | | 44.8 | 42.9 | 44.5 | 42.8 | |
| Total C4, percent Vol | | 10.6 | 10.5 | 11.3 | | 11.3 | 11.3 | 10.6 | 10.0 | |
| Dry Gas, percent weight | | 4.0 | 3.9 | 4.1 | | 3.9 | 3.8 | 3.9 | 3.8 | |
| Coke, percent weight | | 2.7 | 2.6 | 2.5 | | 2.5 | 2.8 | 2.2 | 2.4 | |
| Δ Yields Relative to Catalyst C: | | | | | | | | | | |
| C4, Free 356° F. at 90% Gasoline, percent Vol | | +1.5 | +1.0 | +0.2 | | +2.2 | +1.5 | +2.4 | +2.2 | |
| Total C4, percent Vol | | −1.3 | −0.6 | −0.6 | | −1.6 | −1.2 | −2.2 | −2.3 | |
| Dry Gas, percent weight | | −0.4 | −0.2 | −0.2 | | −0.7 | −0.7 | −0.7 | −0.6 | |
| Coke, percent weight | | +0.4 | +0.3 | +0.3 | | +0.1 | +0.5 | −0.2 | +0.1 | |

[1] Approximately 280 tons of 4.5% REX Catalyst D and 300 tons of 10% REX Catalyst D added to unit during test.

TABLE VII.—PROPERTIES OF CATALYST C AND CATALYST D AGED IN REFINERY TCC UNIT

| Concentrations in Unit, Percent [1]: | | | | | | | | | | |
|---|---|---|---|---|---|---|---|---|---|---|
| Catalyst C | | | 11 | | 7.6 | | 8.8 | | | |
| Catalyst D | | | 4 | | 4.7 | | 6.1 | | | |
| Catalyst C, Days on-Stream | 0 | | 5 | | 10 | | 17 | | | |
| CAT-D Evaluation [2]: | | | | | | | | | | |
| Conversion, Percent Vol | 58.3 | | 51.3 | | | | 49.5 | | | |
| C4, Free Gasoline, Percent Vol | 47.4 | +0.7 | 42.0 | +0.3 | | | 40.2 | 0.0 | | |
| Total C4, Percent Vol | 13.2 | −1.4 | 11.5 | −1.1 | | | 11.2 | −0.8 | | |
| Dry Gas, Percent Wt | 4.7 | −0.4 | 4.3 | −0.2 | | | 4.1 | −0.3 | | |
| Coke, Percent Wt | 3.3 | +0.5 | 3.0 | +0.7 | | | 2.9 | +0.7 | | |
| Loose Density, g./cc. | 0.65 | | | | | | 0.72 | | | |
| Surface Area, m.²/g | 188 | | | | | | | | | |
| Catalyst D, Days on-Stream | 0 | | | | 6 | | 13 | | | |
| CAT-D Evaluation [2]: | | | | | | | | | | |
| Conversion, Percent Vol | 59.5 | | | | 53.8 | | 53.0 | | | |
| C4, Free Gasoline, Percent Vol | 49.6 | +2.1 | | | 44.1 | +0.6 | 44.1 | +1.2 | | |
| Total C4, Percent Vol | 12.3 | −2.7 | | | 12.0 | −1.2 | 10.8 | −2.2 | | |
| Dry Gas, Percent Wt | 4.5 | −0.7 | | | 4.1 | −0.6 | 3.9 | −0.7 | | |
| Coke, Percent Wt | 3.2 | +0.3 | | | 3.3 | +0.8 | 2.9 | +0.5 | | |
| Loose Density, g./cc. | 0.74 | | | | | | | | | |
| Surface Area, m.²/g | 134 | | | | | | | | | |

| Concentrations in Unit, Percent [1]: | | | | | | | | | | |
|---|---|---|---|---|---|---|---|---|---|---|
| Catalyst C | 11.4 | | 10.2 | | 9.7 | | 8.3 | | 9.9 | |
| Catalyst D | 6.8 | | 5.3 | | 4.8 | | 4.7 | | 5.4 | |
| Catalyst C, Days on-Stream | 24 | | 38 | | 45 | | 60 | | 88 | |
| CAT-D Evaluation [2]: | | | | | | | | | | |
| Conversion, Percent Vol | 47.2 | | 45.3 | | 46.0 | | 44.5 | | 43.1 | |
| C4, Free Gasoline, Percent Vol | 38.0 | −0.4 | 38.1 | +1.1 | 38.7 | +1.2 | 36.8 | +0.4 | 37.0 | +2.8 |
| Total C4, Percent Vol | 11.0 | −0.5 | 9.6 | −1.5 | 10.4 | −0.8 | 9.7 | −1.1 | 8.6 | −1.8 |
| Dry Gas, Percent Wt | 4.1 | −0.1 | 3.3 | −0.8 | 3.7 | −0.4 | 3.6 | −0.4 | 3.1 | −0.8 |
| Coke, Percent Wt | 2.9 | +0.8 | 2.5 | +0.5 | 2.3 | +0.3 | 2.5 | +0.5 | 2.3 | +0.4 |
| Loose Density, g./cc. | | | | | | | 0.72 | | 0.72 | |
| Surface Area, m.²/g | 20 | | 34 | | 41 | | 56 | | 84 | |
| Catalyst D, Days on-Stream | | | | | | | | | | |
| CAT-D Evaluation [2]: | | | | | | | | | | |
| Conversion, Percent Vol | 51.5 | | 52.2 | | 50.2 | | 50.0 | | 48.2 | |
| C4, Free Gasoline, Percent Vol | 42.3 | +0.6 | 43.3 | +1.1 | 42.4 | +1.6 | 42.3 | +1.7 | 41.6 | +2.5 |
| Total C4, Percent Vol | 11.3 | −1.3 | 11.3 | −1.5 | 10.0 | −2.2 | 10.6 | −1.6 | 9.3 | −2.3 |
| Dry Gas, Percent Wt | 4.2 | −0.3 | 4.1 | −0.5 | 3.7 | −0.7 | 4.0 | −0.4 | 3.5 | −0.8 |
| Coke, Percent Wt | 2.9 | +0.6 | 2.5 | +0.1 | 2.7 | +0.4 | 2.3 | 0.0 | 2.1 | 0.0 |
| Loose Density, g./cc. | | | | | | | 0.79 | | 0.77 | |
| Surface Area, m.²/g | | | | | | | | | | |

[1] About 55 Tons of Catalyst C added initially; 35 Tons of Catalyst D added subsequently.
[2]  yields compared to standard fresh Catalyst C.

by the standard CAT–D test, was made. The data of Table VII show the improvement in activity and selectivity of Catalyst D over Catalyst C. After three months of aging, the activity of Catalyst D remained at a conversion level about 5 percent higher than that of Catalyst C. Thus, the results of Example 29 are in excellent agreement with the results of Example 28. Additionally, the selectivity of the aged Catalyst D was found superior to that of the aged Catalyst C, also confirming the results of Example 28.

It will be evident from the foregoing examples that a catalyst composite comprising crystalline aluminosilicate particles and substantially inert fines as particularly defined hereinabove, incorporated in an inorganic oxide matrix of substantial catalytic activity, said composite having a sodium content below about 4 percent by weight, and preferably less than 1 weight percent, are vastly improved chemical conversion catalysts exhibiting activity, selectivity and stability unexpectedly superior to compositions without said essential components. It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

We claim:

1. A catalyst composition containing less than 4 percent sodium by weight and comprising three components: (a) finely divided crystalline aluminosilicate particles characterized by an internal structure of rigid three dimensional networks and uniform pores and by high catalytic activity; (b) an inorganic oxide matrix characterized by substantial catalytic activity; and (c) substantially inert, finely divided inorganic solids selected from the group consisting of α-alumina, barytes, zircon, zirconia, kyanite and rutile fines and mixtures thereof, characterized by an alpha ($\alpha$) less than 0.1 and by a weight mean particle size between about 0.1 and 10 microns.

2. The catalyst composition of claim 1, comprising by volume between about 1 and 80 percent crystalline aluminosilicate particles, 10 and 80 percent inorganic oxide matrix, and 5 and 80 percent substantially inert, finely divided inorganic solids.

3. The catalyst composition of claim 1 wherein said crystalline aluminosilicate particles are characterized by uniform pores between about 3 and 15 Angstrom units in diameter and by an alpha ($\alpha$) greater than 2.

4. The catalyst composition of claim 3 wherein said crystalline aluminosilicate particles are crystalline X aluminosilicate having been base exchanged with a solution of cations selected from the group consisting of the cations of elements of Groups I-B—VIII of the Periodic Table, hydrogen, hydrogen precursors and mixtures thereof with one another.

5. The catalyst composition of claim 3 wherein said crystalline aluminosilicate particles are crystalline Y aluminosilicate having been base exchanged with a solution of cations selected from the group consisting of the cations of elements of Groups I-B—VIII of the Periodic Table, hydrogen, hydrogen precursors and mixtures thereof with one another.

6. The catalyst composition of claim 3 wherein said inorganic oxide matrix is a siliceous gel comprising silica and at least one inorganic oxide of the elements selected from the group consisting of Groups II, III-A, IV-B and VI-B of the Periodic Table, and characterized by an alpha ($\alpha$) greater than 0.1, but less than the alpha ($\alpha$) of said crystalline aluminosilicate component.

7. The catalyst composition of claim 6, wherein said inorganic oxide matrix is silica-alumina gel comprising between about 1 and 20 percent by weight alumina and about 80 and 99 percent by weight silica in the matrix phase.

8. A hydrocarbon conversion catalyst composition containing less than 4 percent sodium by weight and comprising three components: (a) finely divided crystalline aluminosilicate particles characterized by uniform pore openings of between 6 and 15 Angstrom units in diameter and by an alpha ($\alpha$) greater than 2; (b) a siliceous oxide matrix comprising silica and at least one inorganic oxide of the elements selected from the group consisting of Groups II, III-A, IV-B and VI-B of the Periodic Table and characterized by an alpha ($\alpha$) greater than 0.1, but less than the alpha ($\alpha$) of said crystalline aluminosilicate component; and (c) substantially inert, finely divided inorganic solids selected from the group consisting of α-alumina, barytes, zircon, zirconia, kyanite and rutile fines and mixtures thereof, and characterized by an alpha ($\alpha$) less than 0.1, and a weight mean particle size between about 0.1 and 3 microns.

9. A hydrocarbon conversion catalyst composition containing less than 4 percent sodium by weight and comprising three components; (a) between about 1 and 80 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X, Y, faujasite and mordenite, and characterized by an alpha ($\alpha$) greater than 2; between about 10 and 80 percent by volume of a siliceous oxide matrix comprising silica and at least one inorganic oxide of the elements selected from the group consisting of Groups II, III-A, IV-B and VI-B of the Periodic Table and characterized by an alpha ($\alpha$) greater than 0.1, but less than the alpha ($\alpha$) of said crystalline aluminosilicate component; and between about 5 and 80 percent by volume of finely divided α-alumina, having a weight mean particle diameter between about 0.1 and 3 microns, and characterized by an alpha ($\alpha$) less than 0.1.

10. The catalyst composition of claim 9 wherein said crystalline aluminosilicate is the product of removing at least 90 percent of the alkali metal ions from an alkali metal aluminosilicate by base exchange with a solution of cations selected from the group consisting of the cations of elements of Group I-B—VIII of the Periodic Table, hydrogen, hydrogen precursors and mixtures thereof with one another.

11. The catalyst composition of claim 9 wherein said composition has been base exchanged with a solution of cations selected from the group consisting of the cations of elements of Group I-B—VIII of the Periodic Table, hydrogen, hydrogen precursors and mixtures thereof with one another.

12. A petroleum stock cracking catalyst composition containing less than 4 percent sodium by weight and comprising three components; (a) between about 2 and 15 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X, Y, faujasite and mordenite, and characterized by an alpha ($\alpha$) greater than 2; between about 50 and 75 percent by volume of a siliceous oxide matrix comprising silica and at least one inorganic oxide of the elements selected from the group consisting of Groups II, III-A, IV-B and VI-B of the Periodic Table and characterized by an alpha ($\alpha$) greater than 0.1, but less than the alpha ($\alpha$) of said crystalline aluminosilicate component; and between about 10 and 45 percent by volume of finely divided α-alumina, having a weight mean particle diameter between about 0.1 and 3 microns, and characterized by an alpha ($\alpha$) less than 0.1.

13. A hydrocracking catalyst composition containing by weight between about 0.1 and 25 percent of a hydrogenation component and less than about 4 percent sodium and comprising three components: (a) between about 25 and 80 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X, Y, faujasite and mordenite, and characterized by an alpha ($\alpha$) greater than 2; between about 10 and 70 percent by volume of a siliceous oxide matrix comprising silica and at least one inorganic oxide of the elements selected from the group consisting of Groups II, III-A, IV-B and VI-B of the Periodic Table and characterized by an alpha ($\alpha$) greater than 0.1, but less than the alpha ($\alpha$) of said crystalline aluminosilicate component; and between about 5 and 50 percent by volume of finely divided α-alumina, having a weight mean particle diameter between about 0.1 and 3 microns, and characterized by an alpha (α) less than 0.1; said component percentages by volume based on the three components.

14. A reforming catalyst composition containing by weight between about 0.3 and 5.0 percent of a hydrogenation component and less than about 4 percent sodium and comprising three components: (a) between about 10 and 25 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X, Y, faujasite and mordenite, and characterized by an alpha (α) greater than 2; between about 10 and 70 percent by volume of a siliceous oxide matrix comprising silica and at least one inorganic oxide of the elements selected from the group consisting of Groups II, III–A, IV–B and VI–B of the Periodic Table and characterized by an alpha (α) greater than 0.1, but less than the alpha (α) of said crystalline aluminosilicate component; and between about 5 and 60 percent by volume of finely divided α-alumina, having a weight mean particle diameter between about 0.1 and 3 microns, and characterized by an alpha (α) less than 0.1; said component percentages by volume based on the three components.

15. An alkylation catalyst composition containing less than 4 percent sodium by weight and comprising three components: (a) between about 50 and 80 percent by volume crystalline alumino-silicate particles, having uniform pore openings of between 6 and 15 Angstrom units in diameter and a weight mean particle diameter between about 0.1 and 40 microns, said crystalline aluminosilicate selected from the group consisting of zeolites X and Y, base exchanged with a solution of cations selected from the group consisting of rare earth, hydrogen, hydrogen precursors and mixtures thereof, calcined in air at a temperature between about 200 and 650° C., and characterized by an alpha (α) greater than 2; between about 10 and 40 percent by volume of a siliceous oxide matrix comprising silica and at least one inorganic oxide of the elements selected from the group consisting of Groups II, III–A, IV–B and VI–B of the Periodic Table and characterized by an alpha (α) greater than 0.1, but less than the alpha (α) of said crystalline aluminosilicate component; and between about 10 and 30 percent by volume of finely divided α-alumina, having a weight mean particle diameter between about 0.1 and 3 microns, and characterized by an alpha (α) less than 0.1.

16. A hydrocarbon conversion catalyst containing by weight between about 0.1 and 25 percent of a hydrogenation component and less than 4 percent sodium by weight and comprising three components: (a) finely divided crystalline aluminosilicate particles characterized by an internal structure of rigid three dimensional networks and uniform pores and by high catalytic activity; (b) an inorganic oxide matrix characterized by substantial catalytic activity; and (c) substantially inert finely divided inorganic solids, selected from the group consisting of α-alumina, barytes, zircon, zirconia, kyanite and rutile fines and mixtures thereof, characterized by an alpha (α) less than 0.1 and by a weight mean particle size between about 0.1 and 10 microns.

17. A process for the catalytic cracking of petroleum stocks which comprises contacting at least one petroleum charge stream under catalytic cracking conditions with a catalyst composition containing less than 4 percent sodium by weight and comprising three components: (a) between about 2 and 15 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X, Y, faujasite and mordenite, and characterized by an alpha (α) greater than 2; (b) between about 50 and 75 percent by volume of a siliceous oxide matrix comprising silica and at least one inorganic oxide of the elements selected from the group consisting of Groups II, III–A, IV–B and VI–B of the Periodic Table and characterized by an alpha (α) greater than 0.1, but less than the alpha (α) of said crystalline aluminosilicate component; and (c) between about 10 and 45 percent by volume of finely divided α-alumina, having a weight mean particle diameter between about 0.1 and 3 microns, and characterized by an alpha (α) less than 0.1.

18. A process for the hydrocracking of petroleum stocks which comprises contacting at least one petroleum charge stream under hydrocracking conditions with a catalyst composition containing by weight between about 0.1 and 25 percent of a hydrogenation component and less than about 4 percent sodium and comprising three components: (a) between about 25 and 80 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X, Y, faujasite and mordenite, and characterized by an alpha (α) greater than 2; (b) between about 10 and 70 percent by volume of a siliceous oxide matrix comprising silica and at least one inorganic oxide of the elements selected from the group consisting of Groups II, III–A, IV–B and VI–B of the Periodic Table and characterized by an alpha (α) greater than 0.1 but less than the alpha (α) of said crystalline aluminosilicate component; and (c) between about 5 and 50 percent by volume of finely divided α-alumina, having a weight mean particle diameter between about 0.1 and 3 microns, and characterized by an alpha (α) less than 0.1; said component percentages by volume based on the three components.

19. A process for the reforming of petroleum stocks which comprises contacting at least one petroleum charge stream under reforming conditions with a catalyst composition containing by weight between about 0.3 and 5.0 percent of a hydrogenation component and less than 4 percent sodium and comprising three components: (a) between about 10 and 25 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X, Y, faujasite and mordenite, and characterized by an alpha (α) greater than 2; (b) between about 10 and 70 percent by volume of a siliceous oxide matrix comprising silica and at least one inorganic oxide of the elements selected from the group consisting of Groups II, III–A, IV–B and VI–B of the Periodic Table and characterized by an alpha (α) greater than 0.1, but less than the alpha (α) of said crystalline aluminosilicate component; and (c) between about 5 and 60 percent by volume of finely divided α-alumina, having a weight mean particle diameter between about 0.1 and 3 microns, and characterized by an alpha (α) less than 0.1; said component percentages by volume based on the three components.

20. An alkylation process which comprises contacting at least one hydrocarbon stream and an olefinic stream under alkylation conditions at a temperature below about 600° F. with a catalyst composition containing less than 4 percent sodium by weight and comprising three components: (a) between about 50 and 80 percent by volume crystalline aluminosilicate particles, having uniform pore openings of between 6 and 15 Angstrom units in diameter and a weight mean particle diameter between about 0.1 and 40 microns, said crystalline aluminosilicate selected from the group consisting of zeolites X and Y, base exchanged with a solution of cations selected from the group consisting of rare earth, hydrogen, hydrogen precursors and mixtures thereof, calcined in air at a temperature between about 200 and 650° C., and characterized by an alpha ($\alpha$) greater than 2; (b) between about 10 and 40 percent by volume of a siliceous oxide matrix comprising silica and at least one inorganic oxide of the elements selected from the group consisting of Groups II, III-A, IV-B and VI-B of the Periodic Table and characterized by an alpha ($\alpha$) greater than 0.1, but less than the alpha ($\alpha$) of said crystalline aluminosilicate component; and (c) between about 10 and 30 percent by volume of finely divided $\alpha$-alumina, having a weight mean particle diameter between about 0.1 and 3 microns, and characterized by an alpha ($\alpha$) less than 0.1.

References Cited by the Examiner

UNITED STATES PATENTS

| | | | |
|---|---|---|---|
| 2,971,903 | 2/1961 | Kimberlin et al. | 208—119 |
| 2,983,670 | 5/1961 | Seubold | 208—110 |
| 3,118,845 | 1/1964 | Innes et al. | 208—120 |
| 3,140,249 | 7/1964 | Plank et al. | 208—120 |
| 2,140,251 | 7/1964 | Plank et al. | 208—120 |
| 3,143,491 | 8/1964 | Bergstrom | 208—120 |

DELBERT E. GANTZ, *Primary Examiner.*

A. RIMENS, *Assistant Examiner.*